(12) United States Patent
Horie et al.

(10) Patent No.: US 10,506,802 B2
(45) Date of Patent: Dec. 17, 2019

(54) ANTI-REVERSE DEVICE FOR FISHING SPINNING REEL AND FISHING SPINNING REEL HAVING THE SAME

(71) Applicant: GLOBERIDE, Inc., Tokyo (JP)

(72) Inventors: Hironori Horie, Tokyo (JP); Hiromu Yasuda, Tokyo (JP)

(73) Assignee: GLOBERIDE, Inc., Tokyo (JP)

( * ) Notice: Subject to any disclaimer, the term of this patent is extended or adjusted under 35 U.S.C. 154(b) by 0 days.

(21) Appl. No.: 16/200,887

(22) Filed: Nov. 27, 2018

(65) Prior Publication Data

US 2019/0090465 A1 Mar. 28, 2019

(30) Foreign Application Priority Data

Nov. 29, 2017 (JP) .................................. 2017-229678
Jan. 18, 2018 (JP) .................................. 2018-006122

(51) Int. Cl.
*A01K 89/01* (2006.01)

(52) U.S. Cl.
CPC ................................ *A01K 89/0117* (2013.01)

(58) Field of Classification Search
CPC .................................................. A01K 89/0117
See application file for complete search history.

(56) References Cited

U.S. PATENT DOCUMENTS

| | | | |
|---|---|---|---|
| 4,288,046 A | 9/1981 | Morimoto et al. | |
| 5,779,171 A * | 7/1998 | Milano, Jr. ......... | A01K 89/028 242/299 |
| 6,102,315 A * | 8/2000 | Sato ................. | A01K 89/01142 242/249 |
| 6,457,662 B1 * | 10/2002 | Sato ....................... | A01K 89/01 242/247 |
| 6,499,683 B1 * | 12/2002 | Tsutsumi ........... | A01K 89/0117 242/247 |

FOREIGN PATENT DOCUMENTS

| | | |
|---|---|---|
| EP | 0811320 B1 | 10/2002 |
| EP | 3262933 A1 | 1/2018 |
| JP | S58-121566 U | 8/1983 |
| JP | 09-205947 A | 8/1997 |

OTHER PUBLICATIONS

Extended European Search Report dated Apr. 2, 2019 issued in corresponding European Patent Application No. 18208813.8.

* cited by examiner

*Primary Examiner* — Emmanuel M Marcelo
(74) *Attorney, Agent, or Firm* — DLA Piper LLP (US)

(57) ABSTRACT

The present invention is to provide an anti-reverse device for a fishing spinning reel having a reduced size and weight. A fishing spinning reel includes a switching moving body movably provided on a reel body and configured to switch a drive body between a reverse-rotation inhibited state and a reverse-rotation allowed state, the drive body being driven through a handle operation, and a switching retention section for restricting movement of the switching moving body so as to retain the reverse-rotation inhibited state or the reverse-rotation allowed state. The switching retention section includes a moving body provided in the reel body and an engagement retention portion provided in the switching moving body. The moving body and the engagement retention portion are arranged in a rotation axis direction of the drive body so as to be opposed to each other, and the moving body is constantly biased toward the engagement retention portion.

8 Claims, 20 Drawing Sheets

ANTI-REVERSE DEVICE FOR FISHING SPINNING REEL AND FISHING SPINNING REEL HAVING THE SAME

CROSS-REFERENCE TO RELATED APPLICATIONS

This application is based on and claims the benefit of priority from Japanese Patent Application Serial Nos. 2017-229678 (filed on Nov. 29, 2017) and Japanese Patent Application Serial No. 2018-006122 (filed on Jan. 18, 2018), the contents of which are hereby incorporated by reference in their entirety.

TECHNICAL FIELD

The present invention relates to an anti-reverse device for a fishing spinning reel and a fishing spinning reel having the anti-reverse device.

As shown in Japanese Patent Application Publication. No. Hei 9-205947 ("the '947 Publication") below, a fishing spinning reel is provided with an anti-reverse device in order to prevent a rotor from rotating reversely at the time of casting or winding. In order to facilitate, at the time of casting, an operation of adjusting a hanging length of a tackle from a rod distal end or an operation of releasing the tackle to a predetermined point, such an anti-reverse device includes a switching operation unit that switches the anti-reverse device from a reverse-rotation inhibited state to a reverse-rotation allowed state. The fishing spinning reel of the '947 Publication is provided also with an engagement retention portion in order to prevent an angler's unintended switching from the reverse-rotation inhibited state to the reverse-rotation allowed state or from the reverse-rotation allowed state to the reverse-rotation inhibited state.

In the '947 Publication above, however, a cam (a switching member 31) and a switching spring (a dead point spring 35) that constitute a switching retention section are disposed so as to be separated outward in a radial direction from a body front portion of a reel body. This has caused the rotor disposed on an outer side of the switching retention section to be increased in size, resulting in a size increase of the fishing spinning reel.

SUMMARY

The present invention is intended to overcome the above-described problem, and one object thereof is to provide an anti-reverse device for a fishing spinning reel having a reduced size and weight.

In order to solve the foregoing problem, an anti-reverse device for a fishing spinning reel as a first aspect of the present invention is provided with a switching moving body movably provided on a reel body and configured to switch a drive body between a reverse-rotation inhibited state and a reverse-rotation allowed state, the drive body being driven through a handle operation, and a switching retention section for restricting movement of the switching moving body so as to retain the reverse-rotation inhibited state or the reverse-rotation allowed state. The switching retention section includes a moving body provided in the reel body and an engagement retention portion provided in the switching moving body. The moving body and the engagement retention portion are arranged in a rotation axis direction of the drive body so as to be opposed to each other, and the moving body is constantly biased toward the engagement retention portion.

According to the first aspect, the switching retention section (the moving body and the engagement retention portion) are arranged in the rotation axis direction of the drive body, and thus unlike in the previously described conventional technique, the switching retention section is not configured to be separated outward in a radial direction. This makes it possible to reduce the size and weight of a reel.

Furthermore, in the first aspect, it is possible that the moving body is disposed in a body front portion of the reel body and is biased frontward, and the engagement retention portion is attached to a bottom surface of the switching moving body and is disposed so as to be engageably opposed to the moving body.

Furthermore, preferably, the switching moving body is made of a synthetic resin and is a bottomed cylindrical component surrounding the body front portion of the reel body and supported so as to be turnable by a predetermined angle, and the engagement retention portion is made of a metal.

According to the foregoing configuration, it is possible to achieve a weight reduction of the switching moving body by forming it with a synthetic resin, while obtaining high strength of the engagement retention portion by forming it with a metal material. Furthermore, the switching moving body constitutes an outer wall of the anti-reverse device, and thus seawater, dust, or the like is unlikely to enter the anti-reverse device. This suppresses, for example, degradation of smoothness of the anti-reverse device, and thus performance of the anti-reverse device can be maintained for a long period of time.

Furthermore, in the first aspect, the anti-reverse device may be formed of a roller-type one-way clutch capable of switching a rotational state of the drive body by using the switching moving body.

Furthermore, in the first aspect, preferably, at a rear end of the switching moving body, a switching operation unit is formed integrally with the switching moving body so as to extend rearward.

According to the foregoing configuration, the switching operation unit and the switching moving body are integrally formed, and thus the number of components used can be reduced.

Furthermore, in a fishing spinning reel provided with the above-described anti-reverse device as a second aspect of the present invention, the switching moving body is an operation cover turnably supported to the body front portion of the reel body, and a support portion slidably supporting the operation cover is provided in the body front portion, the support portion having a plurality of contact portions contacting with the operation cover, and each of the contact portions being separated in a circumferential direction from the other contact portions arranged in the circumferential direction.

According to the second aspect, a region between each pair of adjacent ones of the contact portions does not come into contact with the operation cover, and thus a contact area (a sliding area) where the contact portions come into contact with the operation cover is decreased. Accordingly, a turning operation can be performed with a light force, and it becomes less likely that the operation cover is caught on the body front portion at the time of operating the switching operation unit, thus being able to reliably ensure smooth turning of the operation cover. Furthermore, according to the foregoing invention, a further weight reduction can be achieved compared with a case where a contact portion is formed that extends over an entire circumference of an outer circumferential surface of the body front portion. Moreover, since a space is formed between each pair of adjacent ones of the plurality of contact portions, it is possible to dispose any other component(s) in the space, thus being able to contribute to a size reduction of the fishing spinning reel.

Furthermore, in the second aspect, preferably, the plurality of contact portions include a plurality of front contact portions contacting with a front side of the operation cover and a plurality of rear contact portions contacting with a rear side of the operation cover, and the plurality of front contact portions are separated from the plurality of rear contact portions in a front-rear direction.

According to the foregoing configuration, a region between the plurality of front contact portions and the plurality of rear contact portions does not come into contact with the operation cover, and thus a contact area (a sliding area) where the plurality of front contact portions and the plurality of rear contact portions come into contact with the operation cover is decreased. Accordingly, the body front portion is reduced in weight, and it becomes even less likely that the operation cover is caught on the body front portion at the time of operating the switching operation unit, thus achieving smoother turning of the operation cover.

Furthermore, in the second aspect, preferably, the plurality of front contact portions are circumferentially out of alignment with the plurality of rear contact portions.

According to the foregoing configuration, by the support portion, the operation cover is stably supported on the front and rear sides thereof in the circumferential direction, thus achieving smoother turning thereof.

Furthermore, in the second aspect, preferably, the plurality of front contact portions are formed so as to have an outer diameter smaller than that of the plurality of rear contact portions.

According to the foregoing configuration, in assembling the operation cover to the body front portion, the plurality of front contact portions are unlikely to be caught in the operation cover, and thus assembling ease is improved.

Advantages

As thus described, according to the first aspect, it is possible to provide an anti-reverse device for a fishing spinning reel having a reduced size and weight.

Furthermore, according to the second aspect, it is possible to provide a fishing spinning reel capable of reliably ensuring smooth turning of an operation cover while achieving a weight reduction.

DESCRIPTION OF THE PREFERRED EMBODIMENTS

With reference to the appended drawings, the following describes embodiments of an anti-reverse device for a fishing spinning reel according to the aspects of the present invention. As used herein, "front-rear" and "top-bottom (upper-lower)" refer to directions shown in FIG. 1, and "left-right" refers to a direction shown in FIG. 5.

Figure 1:
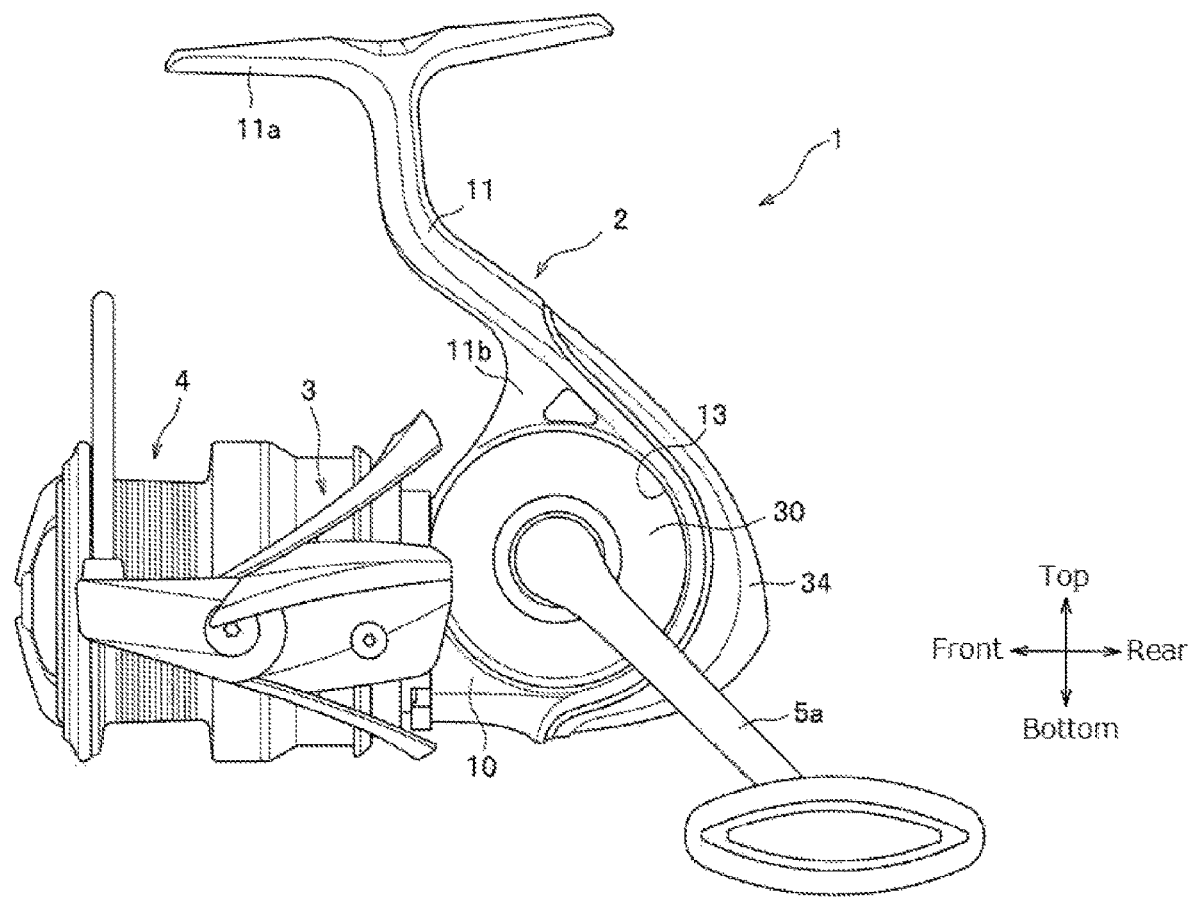
FIG. 1 is a left side view showing an entire configuration of a fishing spinning reel according to an embodiment of the first aspect.

FIG. 1 to FIG. 12 are views for explaining an anti-reverse device for a fishing spinning reel as the first aspect. As shown in FIG. 1, a fishing spinning reel 1 includes a reel body 2 having a drive shaft sleeve 7 (see FIG. 2) and a spool shaft 8 (see FIG. 2), a rotor 4 mounted on the drive shaft sleeve 7 and disposed on a front side of the reel body 2, and a spool 3 mounted on the spool shaft 8 and disposed on a front side of the rotor 4.

The reel body 2 includes a body 10 having a side opening portion 13 formed therethrough, a leg portion 11 extending upward from an upper portion of the body 10 and having a fishing rod mounting portion 11a formed at a distal end thereof, and a cylindrical body front portion 12 (see FIG. 2) that is open on a front side of the body 10 in a front-rear direction. Furthermore, a bearing member 30 is mounted to the side opening portion 13 of the body 10, and a protective cover 34 is mounted to a rear portion of the body 10.

Figure 2:
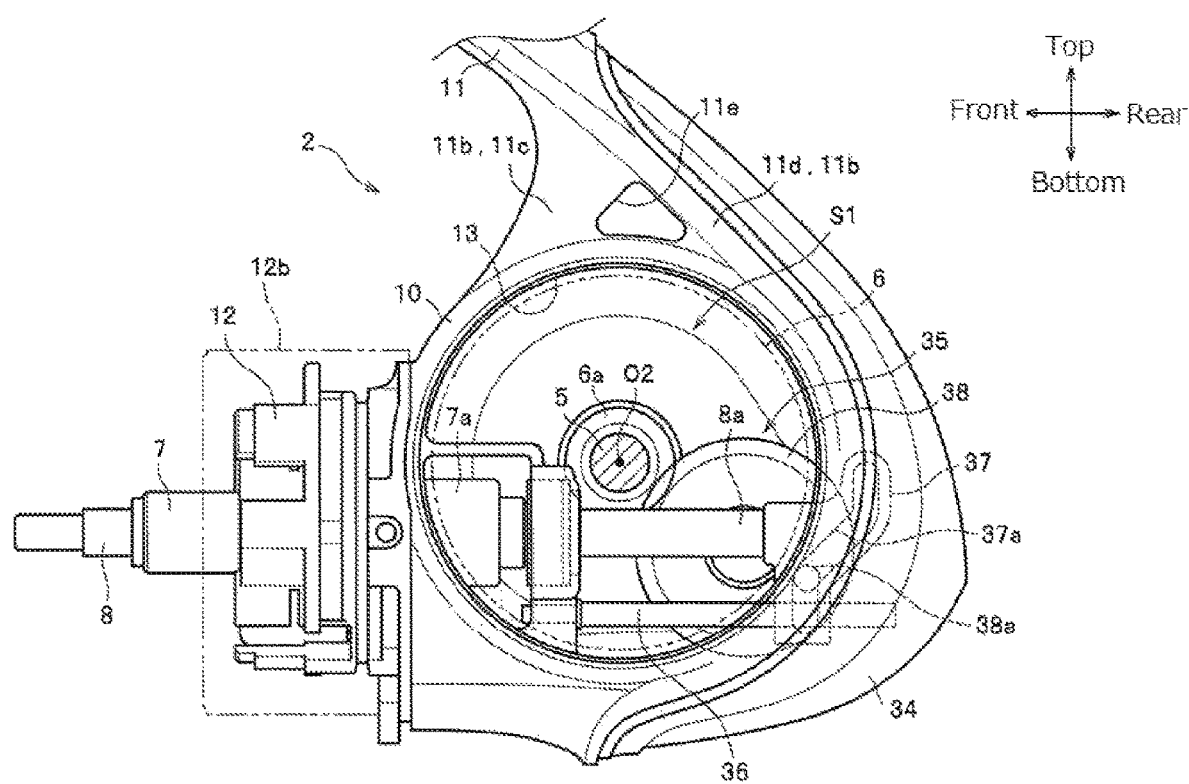
FIG. 2 is a left side view of a reel body from which a bearing member has been removed.

The body 10, the leg portion 11, and the body front portion 12 are integrally formed using a metal material. As shown in FIG. 2, in the body 10, there is formed an interior space for housing a driver. Note that the interior space of the body 10 may also be hereunder referred to as an inside of the body 10 or a housing space S1.

A base portion 11b, which is a lower end portion of the leg portion 11, is formed in a shape bifurcated in the front-rear direction and connects to the upper portion of the body 10. Therefore, the base portion 11b includes a front base portion 11c connecting to a front upper portion of the body 10 and a rear base portion 11d connecting to a rear upper portion of the body 10. Furthermore, between the front base portion 11c and the rear base portion 11d, there is formed a hole portion 11e extending through in a left-right direction.

Figure 3:
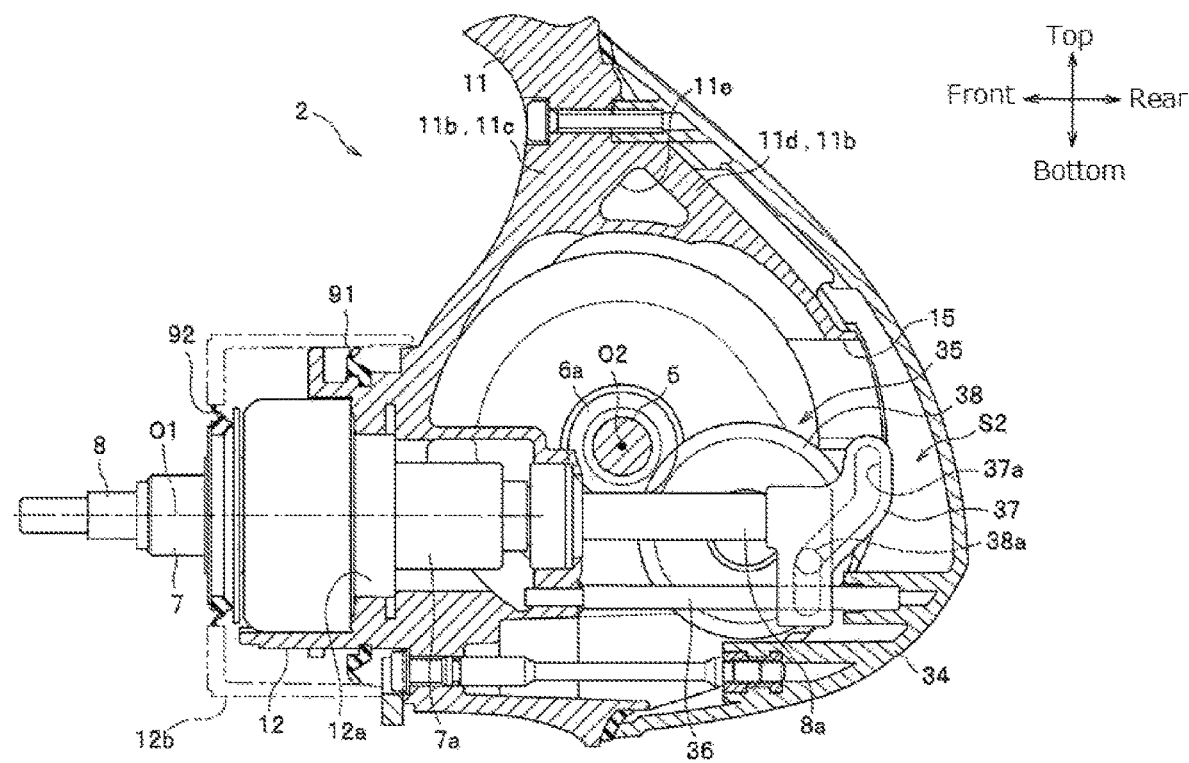
FIG. 3 is a sectional view of the reel body in FIG. 2 cut along a plane including a top-bottom direction and a front-rear direction.

As shown in FIG. 3, the body front portion 12 supports the drive shaft sleeve 7 via an intermediate bearing 12a so that the drive shaft sleeve 7 is rotatable about a center axis O1. Furthermore, a rear end of the drive shaft sleeve 7 protrudes rearward beyond the body front portion 12, and a pinion gear 7a formed at the rear end of the drive shaft sleeve 7 is positioned inside the body 10. Additionally, for the purposes of protection of components housed in the body front portion 12 and aesthetic improvement, a bottomed cylindrical cover 12b is mounted to the body front portion 12.

In the drive shaft sleeve 7, the spool shaft 8 is disposed so as to be slidable in the front-rear direction. A front end of the spool shaft 8 protrudes forward beyond a front end of the drive shaft sleeve 7. Furthermore, a rear portion 8a of the spool shaft 8 protrudes rearward beyond the rear end of the drive shaft sleeve 7 and is positioned inside the body 10.

As shown in FIG. 2, a handle shaft 5 extending in the left-right direction, a drive gear 6 and a gear (a shaft sleeve) 6a that are fixed to the handle shaft 5, and a spool reciprocating device 35 are assembled inside the body 10.

The handle shaft 5 is a rod-shaped member penetrating through the body 10 and the bearing member 30 in the left-right direction and is rotatably supported to the body 10 and the bearing member 30 via a bearing (not shown). A left end of the handle shaft 5 is coupled to a handle Sa (see FIG. 1) disposed on a left side of the body 10. Accordingly, when winding is performed using the handle Sa, the drive gear 6 and the gear 6a rotate about a center axis O2 of the handle shaft 5. Further, a driving force generated by the winding is transmitted to the pinion gear 7a (the drive shaft sleeve 7) meshing with the drive gear 6 and causes the rotor 4 to rotate.

The spool reciprocating device 35 includes a guide shaft 36 extending in the front-rear direction inside the body 10, a slider 37 that moves along the guide shaft 36, the slider 37 having a guide groove 37a formed on a right side surface thereof, and an interlocking gear 38 having an eccentric projection 38a formed thereon, the eccentric projection 38a being engaged with the guide groove 37a. The interlocking gear 38 is provided at a position on a rear lower side with respect to the handle shaft 5 and meshes with a rear side of the gear 6a. Furthermore, when winding is performed using the handle Sa, the interlocking gear 38 meshing with the gear 6a rotates. Then, the eccentric projection 38a of the interlocking gear 38 presses a front surface or a rear surface of the guide groove 37a of the slider 37, thus causing the slider 37 and the spool shaft 8 (the spool 3) to reciprocate in the front-rear direction.

As shown in FIG. 3, a rear opening portion 15 is formed in the rear portion of the body 10 so as to extend therethrough in the front-rear direction. Further, part of the spool reciprocating device 35 is disposed outside the body 10 via the rear opening portion 15. Furthermore, the rear opening portion 15 is closed with the protective cover 34. The protective cover 34 has a bottomed cylindrical shape that is open toward the front side, and a housing space S2 is formed on a front surface side of the protective cover 34. Accordingly, the part of the spool reciprocating device 35 disposed outside the body 10 via the rear opening portion 15 is housed in the housing space S2.

Figure 4:
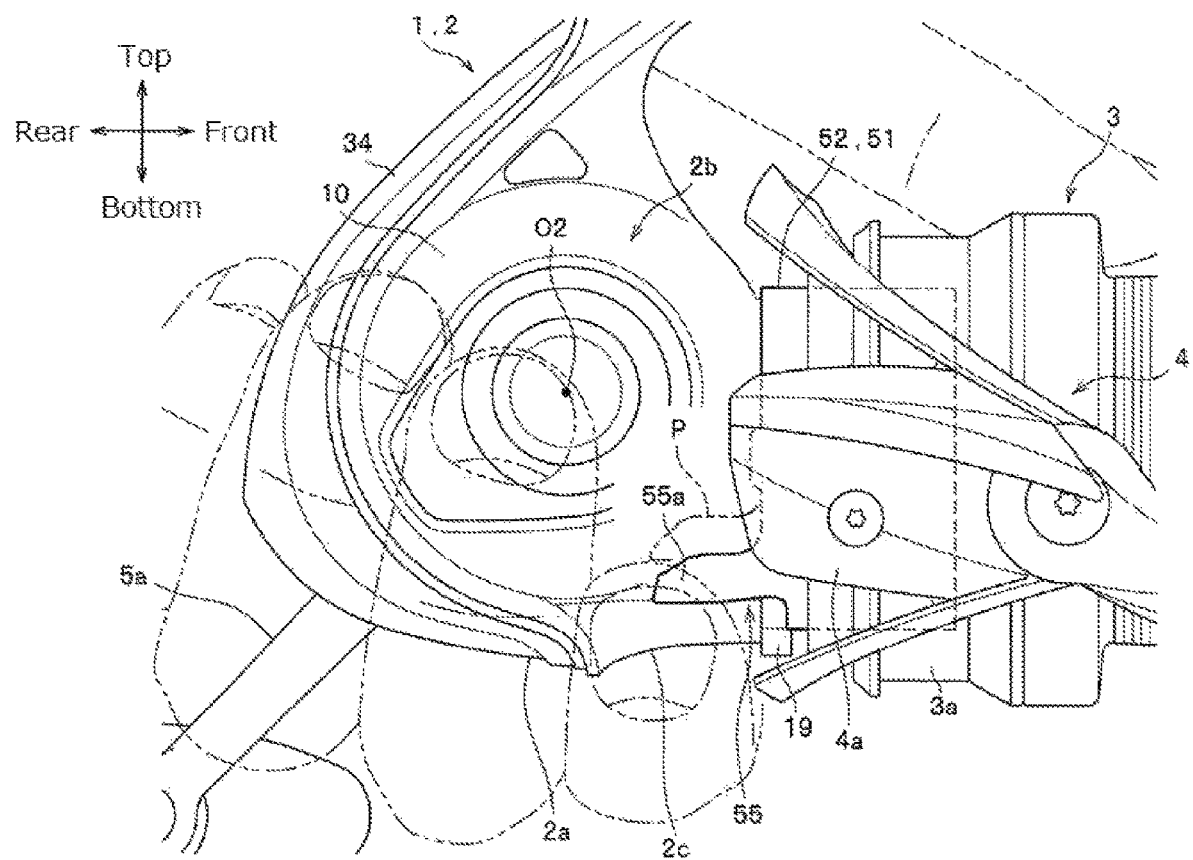
FIG. 4 is a right side view of the fishing spinning reel supported from below with a left hand as seen from a right side.

As shown in FIG. 4, at a right side portion 2b of the reel body 2, there is disposed a switching operation unit 55 for switching between a reverse-rotation inhibited state and a reverse-rotation allowed state of an anti-reverse device 40. The anti-reverse device 40 and the switching operation unit 55 will be mentioned later.

Figure 5:
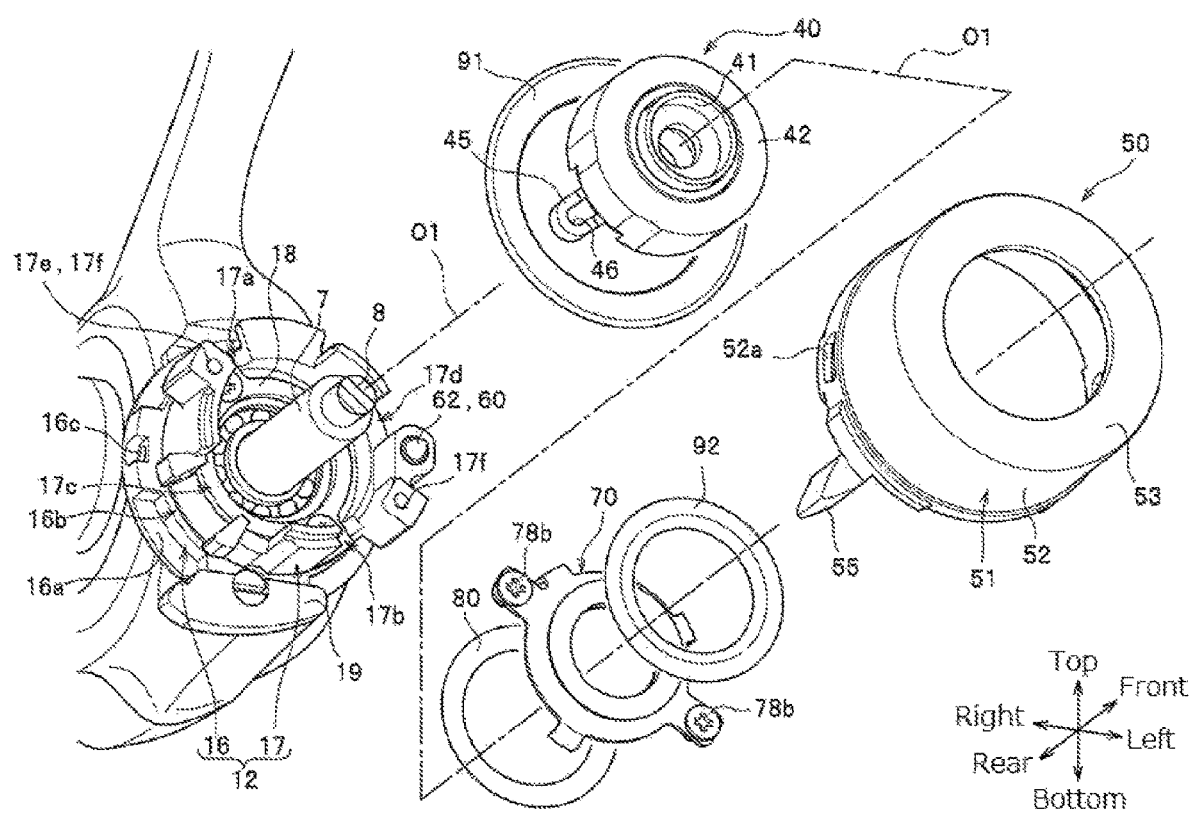
FIG. 5 is a perspective exploded view of components assembled to a body front portion.

Next, the body front portion 12 will be described in detail. As shown in FIG. 5, the body front portion 12 has a substantially circular cylindrical shape about a center axis O1 of the drive shaft sleeve 7. The body front portion 12 has a contour whose diameter is smaller in a front portion thereof than in a rear portion thereof. Hereinafter, the rear portion of the body front portion 12 is referred to as a large diameter portion 16 and the front portion of the body front portion 12 is referred to as a small diameter portion 17.

The anti-reverse device 40, an operation cover 50, a switching retention section 60, a magnetic fluid seal mechanism 70, a restriction body 80, a rear seal member 91, and a front seal member 92 are assembled in the body front portion 12 (the large diameter portion 16, the small diameter portion 17). The operation cover 50 is the cover 12b mentioned earlier. The following describes details of the body front portion 12 (the large diameter portion 16, the small diameter portion 17) and the various components.

Figure 6:
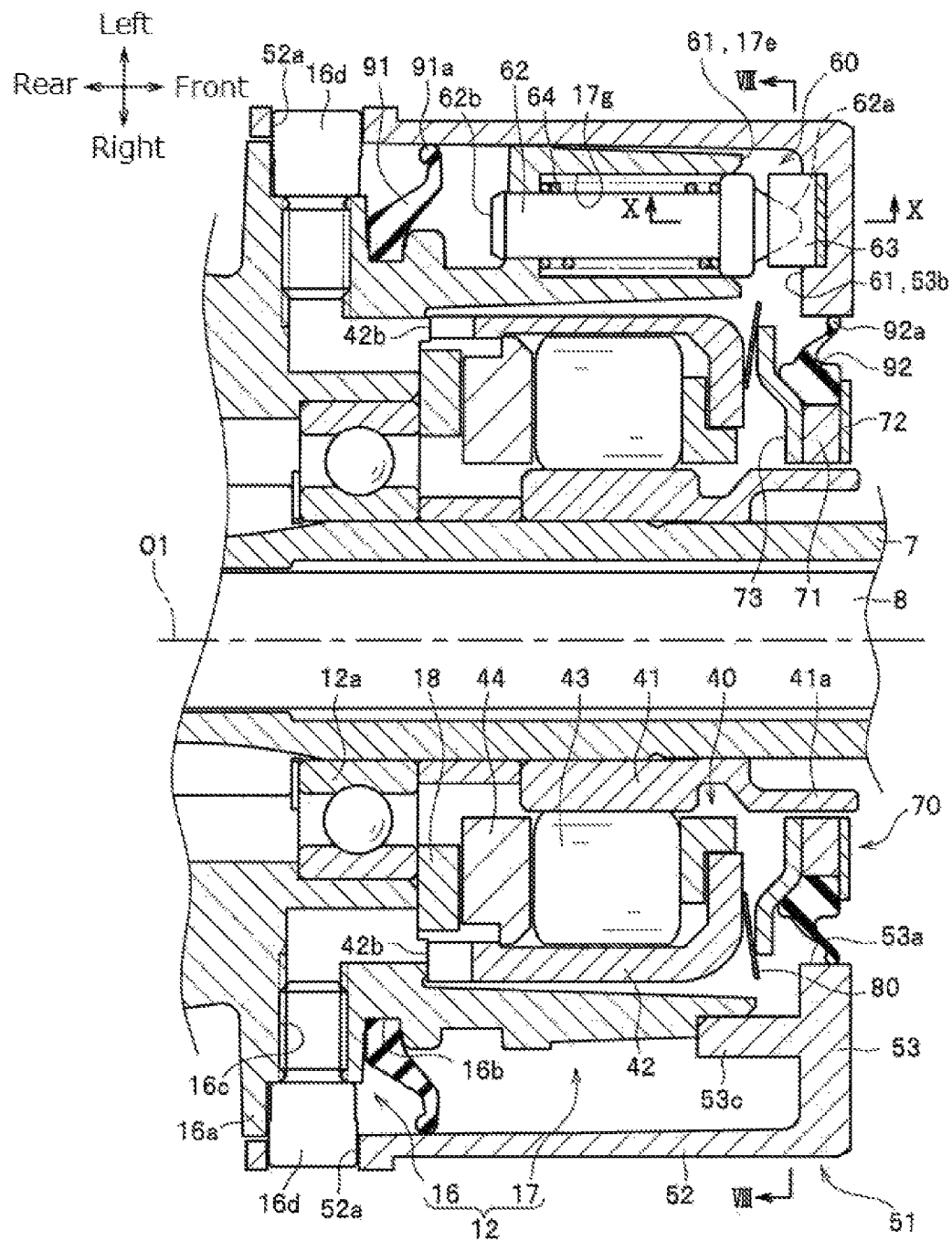
FIG. 6 is a sectional view of a cross section of the body front portion cut along a line VI-VI shown in FIG. 8 as seen from an arrow direction.

As shown in FIG. 6, on an outer circumferential surface of the large diameter portion 16, there are formed a flange 16a overhanging outwards in a radial direction, a circumferential grove 16b recessed over a circumferential direction, and a female screw hole 16c. The flange 16a is provided in a rear end portion of the large diameter portion 16. The flange 16a has a contour in a circular shape corresponding to an inner shape of an after-mentioned switching moving body 51 of the operation cover 50. Accordingly, a rear opening of the switching moving body 51 is closed with the flange 16a, and thus seawater or the like is unlikely to enter the operation cover 50. The circumferential groove 16b is a groove for assembling the rear seal member 91 to the body front portion 12. Two female screw holes 16c are formed at an interval of 180° from each other, and a screw 16d used to prevent the operation cover 50 from coming off is screwed into each of the female screw holes 16c.

Figure 7:
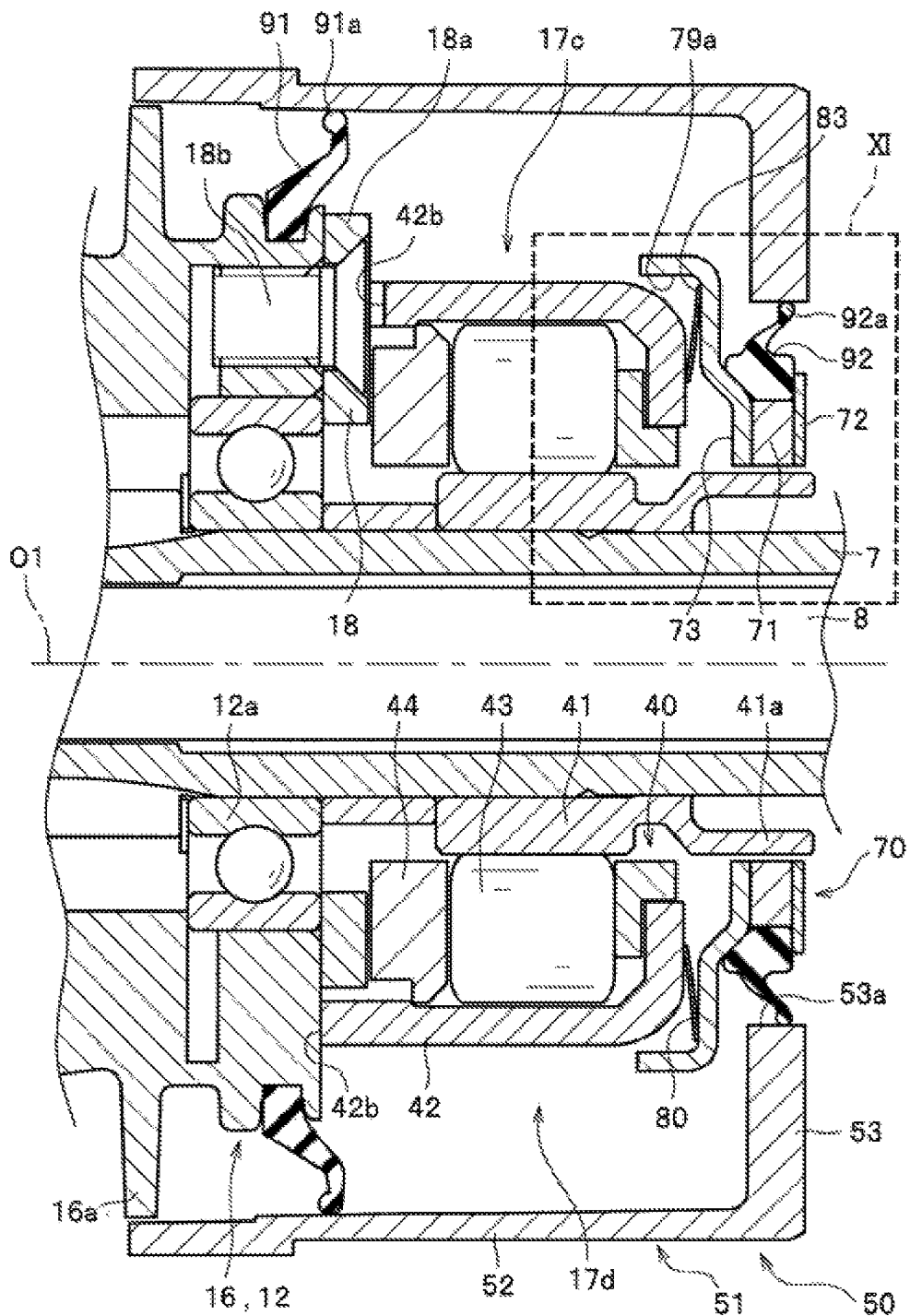
FIG. 7 is a sectional view of a cross section of the body front portion cut along a line VII-VII shown in FIG. 8 as seen from an arrow direction.
Figure 8:
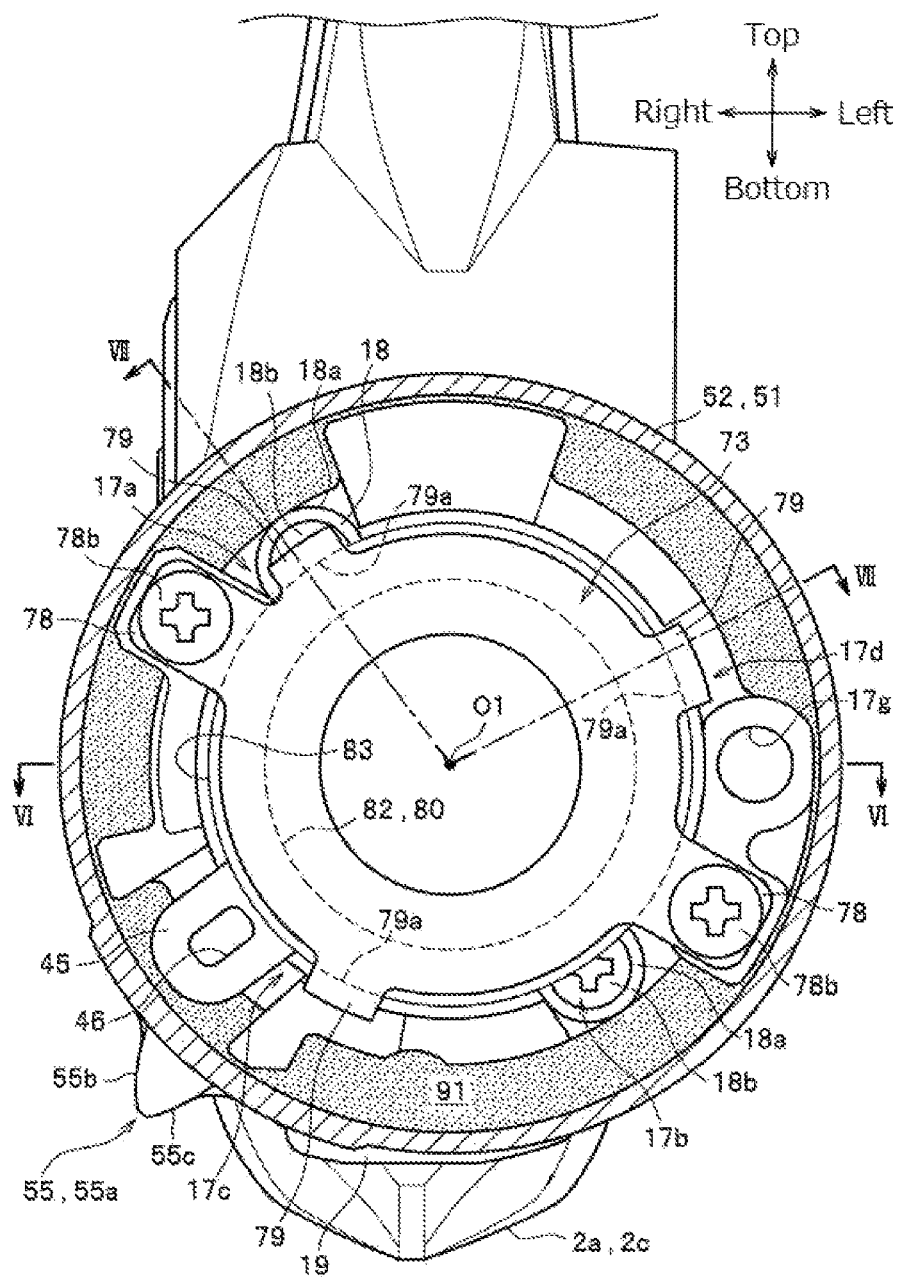
FIG. 8 is a sectional view of a cross section of the body front portion cut along a line VIII-VIII shown in FIG. 6 as seen from an arrow direction, in which only an inner magnetic plate is shown in a magnetic fluid seal mechanism.

The intermediate bearing 12a is fitted on an inner circumferential side of the large diameter portion 16. A retaining ring 18 is in contact with an outer ring of the intermediate bearing 12a so as to prevent the intermediate bearing 12a from falling off the large diameter portion 16. As shown in FIG. 7 and FIG. 8, two flanges 18a are formed on the retaining ring 18 so as to protrude outward in the radial direction. Further, the flanges 18a are each fastened with a screw 18b, and thus the retaining ring 18 is fixed in the small diameter portion 17.

As shown in FIG. 5, a return butting portion 19 is attached to a lower outer circumferential side of the large diameter portion 16. The return butting portion 19 is a constituent element of a bail inversion mechanism. In a case where the rotor 4 rotates in a winding direction in a state where a bail is at a fishing line releasing position, the return butting portion 19 is brought into contact with a return contact member (not shown) provided on an inner circumferential side of an arm portion 4a (see FIG. 4) of the rotor 4, thus causing the bail to be inverted (returned to a fishing line winding position).

The anti-reverse device 40 is housed in the small diameter portion 17. Furthermore, on a front end surface 17e of the small diameter portion 17, there are formed two fixing portions 17f into each of which a screw 78b for fixing the magnetic fluid seal mechanism 70 is screwed, and the magnetic fluid seal mechanism 70 is fixed so as to close a front opening of the small diameter portion 17 (see FIG. 6 and FIG. 7).

The small diameter portion 17 has four cutouts (a first cutout 17a to a fourth cutout 17d) formed to extend rearward from a front end thereof and communicating between an inner circumferential side and an outer circumferential side of the small diameter portion 17. As shown in FIG. 8, the first cutout 17a and the second cutout 17b are intended to receive the flanges 18a of the retaining ring 18, respectively. The first cutout 17a is provided on an upper right side relative to the center axis O1, and the second cutout 17b is provided on a lower left side relative to the center axis O1. The third cutout 17c is intended to receive an after-mentioned protrusion 45 of the anti-reverse device 40 and is provided on a lower right side relative to the center axis O1. The third cutout 17c has a large cutout area so that the protrusion 45 is movable in the circumferential direction. The fourth cutout 17d is intended to receive an after-mentioned latching portion 79 of the magnetic fluid seal mechanism 70 and is provided on an upper left side relative to the center axis O1.

As shown in FIG. 6 and FIG. 7, the anti-reverse device 40 is a roller-type one-way clutch that permits forward rotation of the drive shaft sleeve 7, while preventing reverse rotation of the drive shaft sleeve 7 and thus is formed of a known device. In this embodiment, on an inner circumferential side of the anti-reverse device 40, there is provided an inner ring (a drive shaft•a drive body) 41 that is fitted to an outer circumferential side of the drive shaft sleeve 7 so as to be unrotatably locked to the drive shaft sleeve 7 and is driven by operating the handle 5a. Accordingly, the anti-reverse device 40 controls rotation of the drive shaft sleeve 7 via the inner ring 41. A front portion 41a of the inner ring 41 protrudes forward beyond an outer ring 42 and is positioned on an inner side of the magnetic fluid seal mechanism 70. Further, the inner ring 41 is made of a magnetic material, and the front portion 41a of the inner ring 41 constitutes a magnetic portion of the magnetic fluid seal mechanism 70. Hereinafter, a front portion of the inner ring 41 is referred to as a magnetic portion 41a.

The anti-reverse device 40 includes the substantially circular cylindrical outer ring 42 inserted into the small diameter portion 17, a plurality of rollers 43 disposed between the inner ring 41 and the outer ring 42, and a retainer (a switching control member) 44 retaining the plurality of rollers 43. The anti-reverse device 40 is disposed on a front side of the retaining ring 18. A rear end of the outer ring 42 comes into contact with a bottom surface of the small diameter portion 17, thus restricting rearward movement of the anti-reverse device 40. As shown in FIG. 7, the outer ring 42 has a cutout 42b formed at a rear end thereof, and each of the flanges 18a of the retaining ring 18 is situated in the cutout 42b, thus unrotatably locking the outer ring 42. This restricts turning of the anti-reverse device 40 itself.

On an outer circumferential surface of the retainer 44, there is formed a protrusion 45 penetrating through the outer ring 42 and protruding outward in the radial direction beyond an outer circumferential surface of the outer ring 42 (see FIG. 5). The protrusion 45 is intended to cause the retainer 44 to turn so that the rollers 43 move in the circumferential direction. Accordingly, when the protrusion 45 is caused to move in the circumferential direction, the rollers 43 exerts a wedge action between the inner ring 41 and the outer ring 42, so that reverse rotation of the inner ring 41 (the drive shaft sleeve 7) is prevented, or the rollers 43 exerts no wedge action between the inner ring 41 and the outer ring 42, so that reverse rotation of the inner ring 41 (the drive shaft sleeve 7) is permitted. The protrusion 45 is disposed in the third cutout 17c of the small diameter portion 17 (see FIG. 8). Furthermore, the protrusion 45 has an ellipsoidal circular hole 46 formed to extend therethrough in the front-rear direction.

Figure 9A:
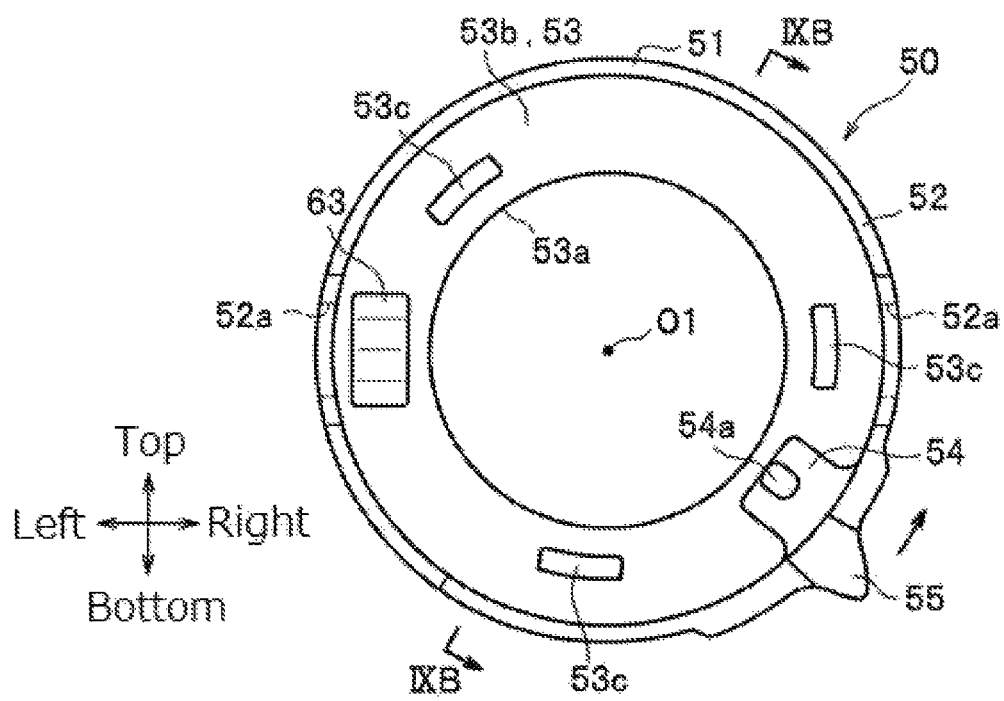
FIG. 9a is a back view of an operation cover as seen from a rear side, which is solely extracted from the fishing spinning reel.
Figure 9B:
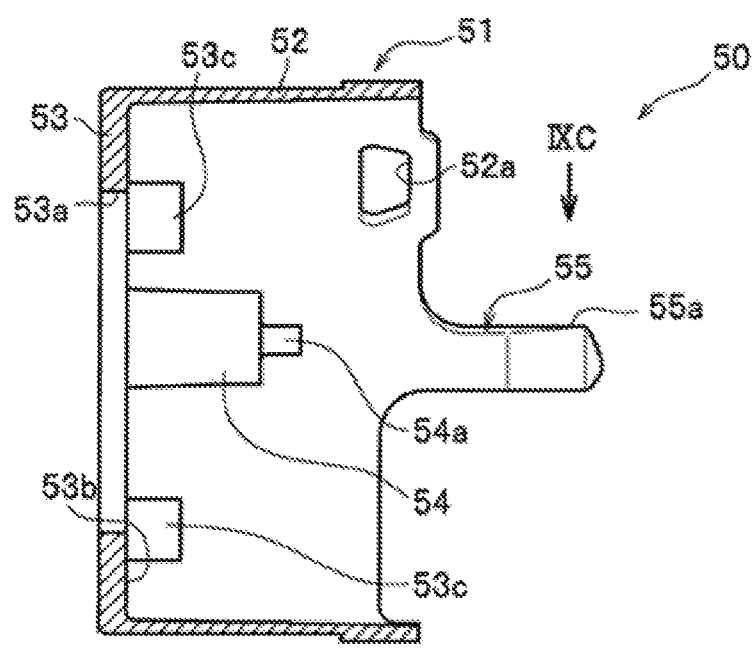
FIG. 9b is a sectional view of a cross section cut along a line IXB-IXB in FIG. 9a as seen from an arrow direction.

As shown in FIG. 6 and FIG. 7, the operation cover 50 is a cylindrical member disposed on an outer circumferential side of the body front portion 12 (the large diameter portion 16, the small diameter portion 17). As shown in FIG. 9a and FIG. 9b, the operation cover 50 includes the bottomed cylindrical switching moving body 51, an engagement portion 54 provided on an inner side of the switching moving body 51, and the switching operation unit 55 provided at a rear end of the switching moving body 51. The switching moving body 51, the engagement portion 54, and the switching operation unit 55 are integrally formed using a synthetic resin, thus reducing the number of components used.

The switching moving body 51 includes a circular cylindrical portion 52 having a circular cylindrical shape about the center axis O1 and a ring-shaped front wall portion 53 extending inward in the radial direction from a front end of the circular cylindrical portion 52. As shown in FIG. 6 and FIG. 7, the switching moving body 51 surrounds the outer circumferential side of the body front portion 12 (the large diameter portion 16, the small diameter portion 17), and thus seawater, dust, or the like is unlikely to enter the anti-reverse device 40. This suppresses, for example, degradation of smoothness of the anti-reverse device 40, and thus performance of the anti-reverse device 40 is maintained for a long period of time.

An inner circumferential surface of the circular cylindrical portion 52 is partially in contact with an outer circumferential surface of the body front portion 12 (the large diameter portion 16, the small diameter portion 17). Therefore, the operation cover 50 is mounted so as to be slidable (turnable) in the circumferential direction with respect to the body front portion 12. The circular cylindrical portion 52 has two through holes 52a formed in a rear portion thereof at an interval of 180 degrees from each other (see FIG. 9a). In each of the through holes 52a, there is disposed the screw 16d screwed to the large diameter portion 16, and thus the operation cover 50 is prevented from falling off the body front portion 12. Each of the through holes 52a is formed to be elongated in the circumferential direction so as not to obstruct of the operation cover 50.

A central hole 53a of the front wall portion 53 is a hole into which the drive shaft sleeve 7 and the spool shaft 8 are to penetrate. As shown in FIG. 9a and FIG. 9b, on a rear surface (a bottom surface) 53b of the front wall portion 53, there are formed three guide walls 53c protruding rearward. The guide walls 53c are in contact with an outer circumferential surface of the small diameter portion 17 (see FIG. 6). This suppresses occurrence of looseness at the time of turning of the operation cover 50, thus achieving smooth turning of the operation cover 50.

As shown in FIG. 9a and FIG. 9b, the engagement portion 54 is formed in a quadrangular prism shape and is continuous with the inner circumferential surface of the circular cylindrical portion 52 and the rear surface 53b of the front wall portion 53. Furthermore, on a rear end surface of the engagement portion 54, there is formed a circular columnar projection 54a extending rearward. Although not particularly shown, the engagement portion 54 is disposed in the third cutout 17c of the small diameter portion 17, with the projection 54a inserted in the circular hole 46 of the protrusion 45. Therefore, the operation cover 50 is engaged with the retainer 44 in the circumferential direction. Accordingly, when an angler causes the switching moving body 51 to turn, the anti-reverse device 40 is switched between the reverse-rotation inhibited state and the reverse-rotation allowed state.

As shown in FIG. 4, a rear end portion of the circular cylindrical portion 52 protrudes rearward through a rear end opening of the rotor 4 on a rear side of a skirt portion 3a of the spool 3. Accordingly, the switching operation unit 55 extending rearward from a rear end of the circular cylindrical portion 52 protrudes rearward beyond a rear end portion of the arm portion 4a of the rotor 4. The switching operation unit 55 overlaps, on a proximal side (a front end side) thereof, with the arm portion 4a of the rotor 4 in the front-rear direction, while a region extending from an intermediate portion to a rear end portion of the switching operation unit 55 is disposed closer to the rear than the arm portion 4a and thus does not overlap with the arm portion 4a of the rotor 4 in the front-rear direction. Accordingly, in this embodiment, by grasping the intermediate portion or the rear end portion of the switching operation unit 55, it is possible to operate the switching operation unit 55 without making contact with the rotor 4 and so on. Hereinafter, a portion of the switching operation unit 55 protruding rearward beyond the spool 3 and the rotor 4 is referred to as an operation body portion 55a.

The switching operation unit 55 is disposed at a side portion of the reel body 2. Specifically, in a case where the anti-reverse device 40 is in the reverse-rotation inhibited state, the switching operation unit 55 is positioned nearer to the bottom of the right side portion 2b of the reel body 2. Furthermore, in a case where the anti-reverse device 40 is in the reverse-rotation allowed state, the switching operation unit 55 is positioned somewhat upper than in the case where the anti-reverse device 40 is in the reverse-rotation inhibited state (see a broken line P in FIG. 4). That is, whether the anti-reverse device 40 is in the reverse-rotation inhibited state or in the reverse-rotation allowed state, the switching operation unit 55 is constantly positioned at the right side portion 2b of the reel body 2 and fits within a contour 2c defining an outline of the side portion of the reel body 2 as seen sideways.

According to the above-described configuration, the switching operation unit 55 does not extend outward beyond the contour 2c of the reel body 2 as seen sideways. Accordingly, even when a fishing line moves along the contour 2c of the reel body 2, the fishing line is prevented from becoming tangled around the switching operation unit 55. Furthermore, even in a case where the reel body 2 is dropped during travel to another fishing site, so that the contour 2c of the reel body 2 is brought into contact with a ground or the like, the switching operation unit 55 is hardly brought into contact with the ground or the like and thus is unlikely to be damaged. Furthermore, also during transportation, the switching operation unit 55 is hardly subjected to an impact and thus is less likely to be damaged while being transported.

Furthermore, according to the above-described configuration, in operating the switching operation unit 55, as shown in FIG. 4, for example, a palm of one hand, for example, a left hand (or jointed portions of a forefinger, a middle finger, and a ring finger) is placed against a lower surface 2a of the reel body 2, and the forefinger, the middle finger, and the ring finger of the left hand are wrapped toward the right side portion 2b of the reel body 2. Then, the operation body portion 55a of the switching operation unit 55 is operated using a thick of a tip of any of the forefinger, the middle finger, and the ring finger of the left hand disposed at the right side portion 2b of the reel body 2. The switching operation unit 55 can be operated in this manner. That is, it is possible to operate the switching operation unit 55 while supporting a lower portion of the reel body 2 with the left hand. Therefore, it is possible to avoid a situation where a load for operating the switching operation unit 55 acts on the fishing spinning reel 1 to make an operation of the fishing spinning reel 1 unstable, resulting in difficulty in operating the switching operation unit 55. With the above-described configuration, the fishing spinning reel 1 of this embodiment provides ease in operating the switching operation unit 55 and excellent operability in actual fishing.

Furthermore, the operation body portion 55a is positioned closer to the front and lower than the center axis O2 of the handle 5. According to this configuration, the operation body portion 55a is in closest proximity to the forefinger among the fingers of the left hand supporting the lower portion of the reel body 2. Accordingly, it is possible to operate the operation body portion 55a with the forefinger that moves most ingeniously among the fingers, thus providing improved operability.

Furthermore, the switching operation unit 55 is disposed at the right side portion 2b of the reel body 2, which is a right-hand one of side portions of the reel body 2, and not at a left side portion of the reel body 2 where the handle Sa is provided. Therefore, in operating the operation body portion 55a of the switching operation unit 55, no contact is made with the handle Sa, thus providing improved operability.

Figure 9C:
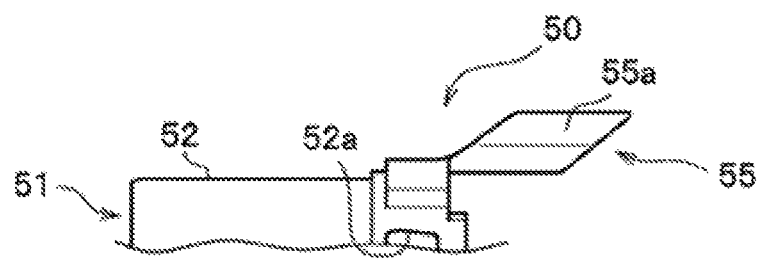
FIG. 9c is a view of a switching operation unit as seen from an arrow IXC direction in FIG. 9b.

As shown in FIG. 8, an outer surface of the operation body portion 55a protrudes outward in the radial direction beyond an outer circumferential surface of the circular cylindrical portion 52 and has a triangular shape as seen in cross section. As shown in FIG. 9c, an outer surface of the switching operation unit 55 on the proximal side (a front side) thereof is concave inward in the radial direction beyond the operation body portion 55a (the intermediate portion and the rear end portion of the switching operation unit 55) so as not to interfere with the rear end portion of the arm portion 4a of the rotor 4.

As shown in FIG. 8, the outer surface of the switching operation unit 55 is composed of an ON operation surface 55b and an OFF operation surface 55c. The ON operation surface 55b faces one side (a substantially upper side) in the circumferential direction along the outer circumferential surface of the circular cylindrical portion 52. The OFF operation surface 55c faces the other side (a substantially lower side) in the circumferential direction along the outer circumferential surface of the circular cylindrical portion 52. The ON operation surface 55b is an operation surface that is pressed downward so as to switch from the reverse-rotation allowed state to the reverse-rotation inhibited state. The OFF operation surface 55c is an operation surface that is pressed upward so as to switch from the reverse-rotation inhibited state to the reverse-rotation allowed state. Furthermore, the ON operation surface 55b and the OFF operation surface 55c are each formed in a substantially planar shape, so that they can be pressed with a thick of a finger and thus are easily operated.

The switching retention section 60 is intended to retain the reverse-rotation inhibited state or the reverse-rotation allowed state of the anti-reverse device 40 and prevent an angler's unintended switching from the reverse-rotation inhibited state to the reverse-rotation allowed state or from the reverse-rotation allowed state to the reverse-rotation inhibited state.

As shown in FIG. 6, the switching retention section 60 includes an opposed portion 61 in which the reel body 2 and the switching moving body 51 are opposed to each other, a moving body 62, and an engagement retention portion 63. Furthermore, in this embodiment, in the reel body 2, the opposed portion 61 refers to the front end surface 17e of the small diameter portion 17, while in the switching moving body 51, the opposed portion 61 refers to the rear surface (the bottom surface) 53b of the front wall portion 53.

The front end surface 17e of the small diameter portion 17 has a moving body housing hole 17g extending rearward therethrough. The moving body 62 and a coil spring 64 are housed in the moving body housing hole 17g. The moving body 62 is a circular columnar component made of a synthetic resin and extending in the front-rear direction. A front end 62a of the moving body 62 is formed in a conical shape. A rear end 62b of the moving body 62 penetrates through the moving body housing hole 17g and is latched to a rear surface of the moving body housing hole 17g. Therefore, the moving body 62 is prevented from coming off the moving body housing hole 17g. The coil spring 64 is incorporated in a compressed state so that the moving body 62 is constantly biased forward.

As shown in FIG. 9a, the engagement retention portion 63 is a plate-shaped member extending along the rear surface 53b of the front wall portion 53. The engagement retention portion 63 is made of a metal material and thus has higher strength and better durability than the moving body 62 made of a synthetic resin. The engagement retention portion 63 of the present invention preferably has higher strength than the moving body 62, and a material thereof is not limited to a metal material. Additionally, in order to improve strength of the engagement retention portion 63, the engagement retention portion 63 and the switching moving body 51 to which the engagement retention portion 63 is fixed may be integrally formed using a metal material. It is, however, more preferable that, as in this embodiment, the engagement retention portion 63 be made of a metal material and the switching moving body 51 be made of a synthetic resin from the viewpoint of reducing a weight of the whole configuration.

Figure 10:
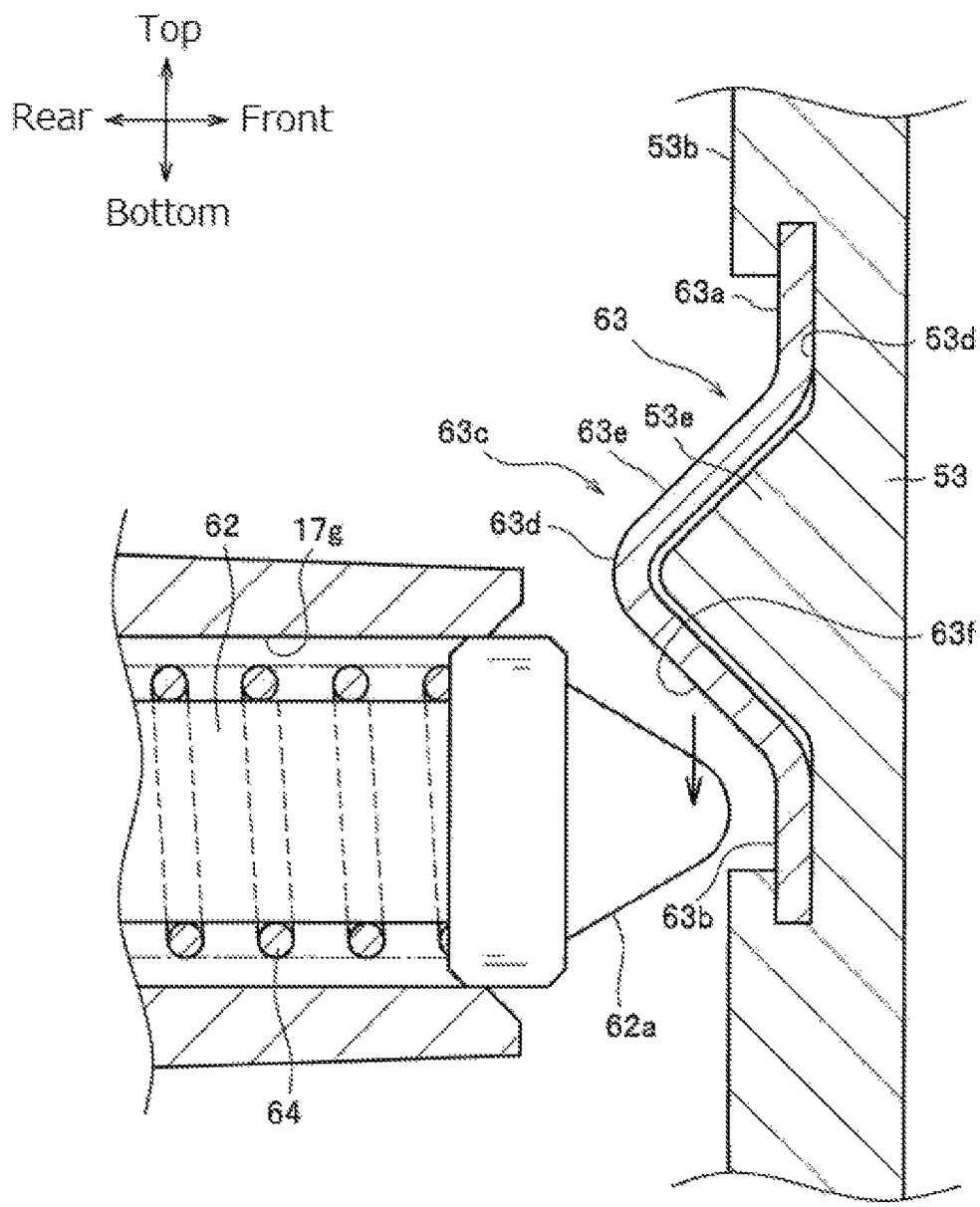
FIG. 10 is a sectional view of a cross section cut along a line X-X in FIG. 6 as seen from an arrow direction.

The engagement retention portion 63 is disposed on a left side with respect to the center axis O1 so as to be opposed to the moving body 62. Specifically, as shown in FIG. 10, in a case where the anti-reverse device 40 is in the reverse-rotation inhibited state, a lower end portion 63b of the engagement retention portion 63 is opposed to the moving body 62 in the front-rear direction. Although not particularly shown, in a case where the switching moving body 51 turns (see an arrow in FIG. 9a) to bring the anti-reverse device 40 to the reverse-rotation allowed state, in other words, in a case where the engagement retention portion 63 also turns to be displaced downward (see an arrow in FIG. 10), an upper end portion 63a of the engagement retention portion 63 is opposed to the moving body 62 in the front-rear direction.

As shown in FIG. 10, the upper end portion 63a and the lower end portion 63b of the engagement retention portion 63 are each a flat surface and are separated from the front end 62a of the moving body 62. Meanwhile, a convex portion 63c shaped so as to be convex rearward is formed in an intermediate portion of the engagement retention portion 63 in a top-bottom direction (a moving direction) thereof. The convex portion 63c has a vertex 63d provided in a middle portion thereof in the top-bottom direction, an upper inclined surface 63e extending from the vertex 63d toward the upper end portion 63a, and a lower inclined surface 63f extending from the vertex 63d toward the lower end portion 63b. Accordingly, when the anti-reverse device 40 attempts to switch from the reverse-rotation allowed state to the reverse-rotation inhibited state, the moving body 62 is latched to the lower inclined surface 63f, and thus turning of the switching moving body 51 is restricted. Furthermore, when the anti-reverse device 40 attempts to switch from the reverse-rotation inhibited state to the reverse-rotation allowed state, the upper inclined surface 63e is latched to the moving body 62, and thus turning of the switching moving body 51 is restricted. With the above-described configuration, unless the upper inclined surface 63e or the lower inclined surface 63f presses the moving body 62 rearward to apply a force sufficient enough to cause the vertex 63d to run over the moving body 62, the reverse-rotation allowed state or the reverse-rotation inhibited state of the anti-reverse device 40 is retained.

Furthermore, on the rear surface 53b of the front wall portion 53 of the switching moving body 51, there is formed a concave portion 53d that is concave forward so as to correspond to a contour of the engagement retention portion 63, and the engagement retention portion 63 is housed in the concave portion 53d. Therefore, a distance between the switching moving body 51 and the body front portion 12 is shortened by a concave amount of the concave portion 53d, and thus the fishing spinning reel 1 is reduced in size in the front-rear direction.

Furthermore, on a bottom surface of the concave portion 53d, there is formed a convex portion 53e that is convex rearward, and thus the bottom surface of the concave portion 53d corresponds to a shape of the engagement retention portion 63. This prevents a situation where a projection amount of the convex portion 63c of the engagement retention portion 63 is decreased over time, so that turning of the switching moving body 51 is undesirably facilitated.

Conventionally, constituent elements of the switching retention section are provided in locations largely separated outward in the radial direction from the body front portion 12 (the reel body 2), and this has led to a size increase of the skirt portion 3a of the rotor 4 positioned on an outer side. On the other hand, according to this embodiment, one of the constituent elements (the moving body 62) is provided in the body front portion 12 (the reel body 2), while the other constituent element (the engagement retention portion 63) is provided in the switching moving body 51, and these constituent elements are disposed in a center axis O1 direction so as to be opposed to each other. Accordingly, these constituent elements are prevented from protruding outward in the radial direction, and thus a size reduction is achieved. Furthermore, since the moving body 62 and the engagement retention portion 63 are disposed in proximity to each other, further size and weight reductions are achieved compared with the conventional configuration.

Figure 11:
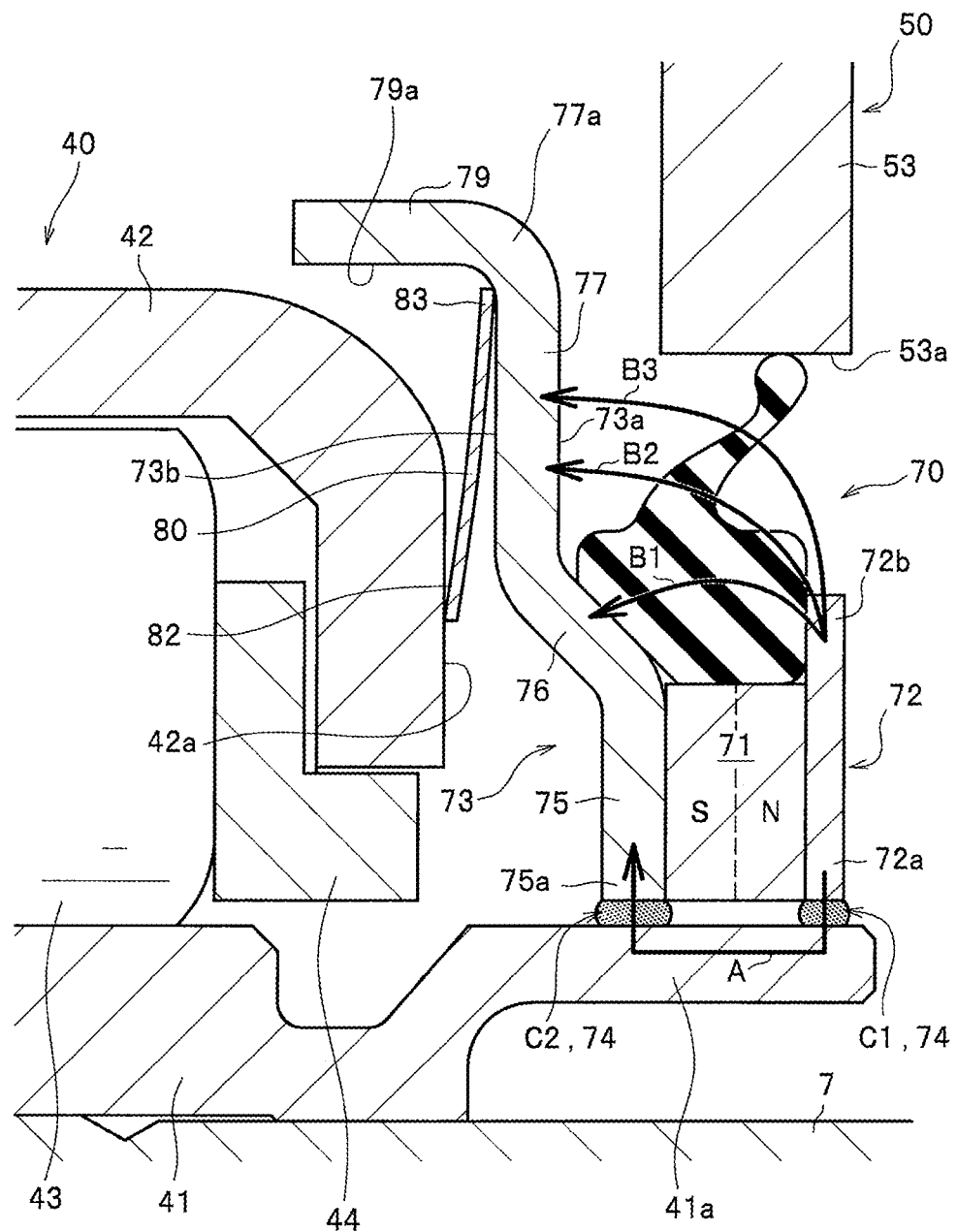
FIG. 11 is an enlarged view of a region enclosed by a broken line XI in FIG. 7.

As shown in FIG. 11, the magnetic fluid seal mechanism 70 includes an annular permanent magnet 71, an annular outer magnetic plate 72 disposed on a front side (an outer side) of the permanent magnet 71, an annular inner magnetic plate 73 disposed on a rear side (an inner side) of the permanent magnet 71, a magnetic portion 41a formed integrally with the inner ring 41, and a magnetic fluid 74. The permanent magnet 71, the outer magnetic plate 72, and the inner magnetic plate 73 are integrally formed using an adhesive.

The permanent magnet 71 has a north pole on a front surface side thereof and a south pole on a rear surface side thereof. Accordingly, an inner circumferential side magnetic circuit (see an arrow A in FIG. 11) and an outer circumferential side magnetic circuit (see arrows B1 to B3 in FIG. 11) are formed from a front surface toward a rear surface of the permanent magnet 71.

The outer magnetic plate 72 and the inner magnetic plate 73 are each formed of a material having a high magnetic permeability and constitute a magnetic circuit that concentrates magnetic flux generated from the permanent magnet 71. The outer magnetic plate 72 is formed so as to have an inner diameter slightly larger than an outer diameter of the magnetic portion 41a. Accordingly, a gap C1 is formed between the outer magnetic plate 72 and the magnetic portion 41a. The outer magnetic plate 72 is formed so as to have an outer diameter larger than an outer diameter of the permanent magnet 71. Accordingly, an outer circumferential end 72b of the outer magnetic plate 72 is positioned on an outer side in the radial direction with respect to the permanent magnet 71.

Figure 12:
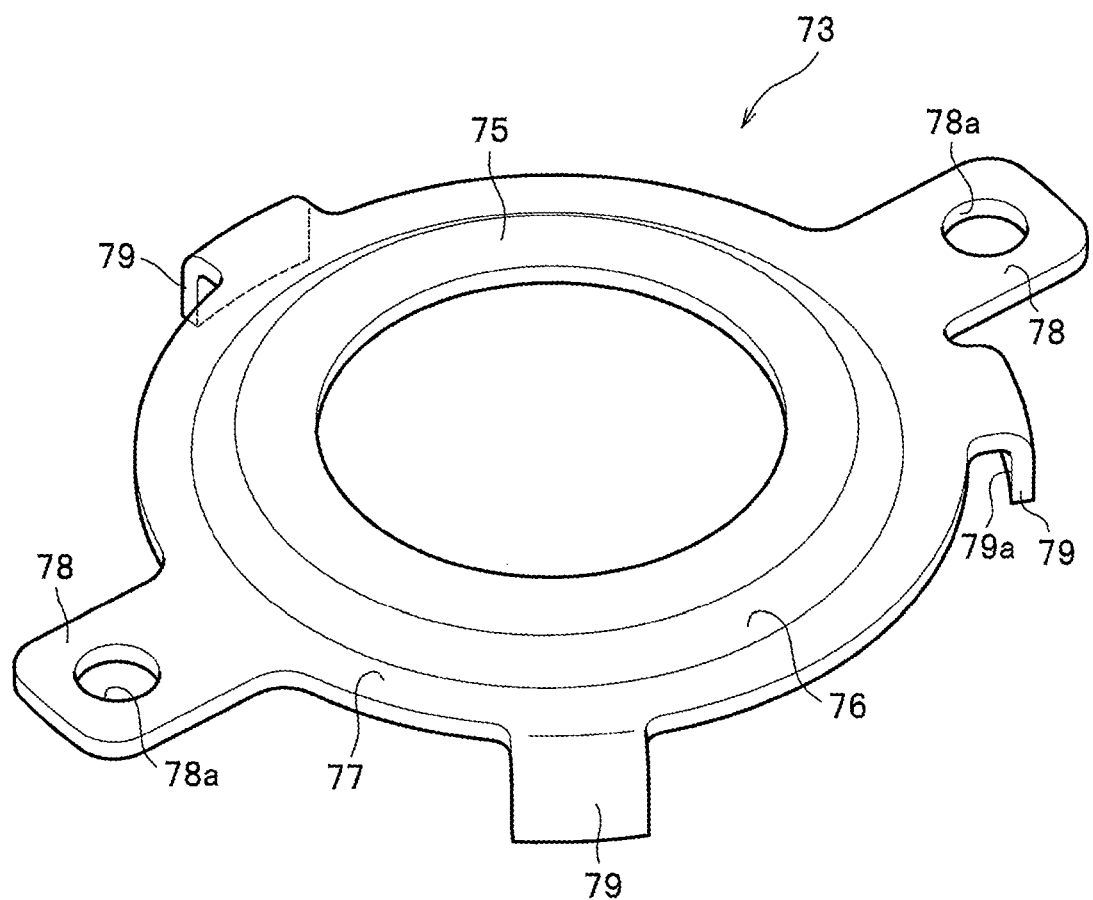
FIG. 12 is a perspective view of the inner magnetic plate of the magnetic fluid seal mechanism, which is solely extracted from the fishing spinning reel.

As shown in FIG. 12, the inner magnetic plate 73 includes an annular inner circumferential portion 75 positioned on an inner circumferential side, an annular intermediate portion 76 extending outward in the radial direction from an outer circumferential edge of the inner circumferential portion 75, an annular outer circumferential portion 77 continuous with an outer circumferential edge of the intermediate portion 76, two flanges 78 protruding outward in the radial direction from the outer circumferential portion 77, and three latching portions 79 extending rearward from the outer circumferential portion 77.

As shown in FIG. 11, the inner circumferential portion 75 is a portion for retaining the permanent magnet 71. The inner circumferential portion 75 is formed so as to have an inner diameter slightly larger than the outer diameter of the magnetic portion 41a. Accordingly, a gap C2 is formed between the inner circumferential portion 75 (the inner magnetic plate 73) and the magnetic portion 41a.

The intermediate portion 76 is disposed on an outer side in the radial direction with respect to an outer circumferential surface of the permanent magnet 71 and holds, in cooperation with an outer circumferential end 72b of the outer magnetic plate 72, a front seal member 92 between them. The intermediate portion 76 is positioned closer to the rear and inclined rearward in a direction from an inner circumferential side to an outer circumferential side, so that the inner circumferential portion 75 is positioned closer to the front than the outer circumferential portion 77. Accordingly, the permanent magnet 71 retained by the inner circumferential portion 75 is also disposed nearer to the front and is separated from the anti-reverse device 40.

The outer circumferential portion 77 protrudes outward in the radial direction beyond the outer circumferential end 72b of the outer magnetic plate 72. That is, the inner magnetic plate 73 is formed so as to have an outer diameter larger than the outer diameter of the outer magnetic plate 72. Furthermore, the outer circumferential portion 77 is formed so as to have an outer diameter slightly larger than an outer diameter of the outer ring 42 of the anti-reverse device 42.

Each of the flanges 78 is a portion for fixing the magnetic fluid seal mechanism 70 to the body front portion 12 and has a hole 78a into which the screw 78b is to penetrate. As shown in FIG. 8, each of the flanges 78 is fastened with the screw 78b screwed into each of the fixing portions 17f (see FIG. 5) of the body front portion 12.

The three latching portions 79 extend rearward while being separated from each other in the circumferential direction and are intended to retain the restriction body 80. Furthermore, the latching portions 79 are disposed in the first cutout 17a, the third cutout 17c, and the fourth cutout 17d of the small diameter portion 17, respectively, so as not to interfere with the small diameter portion 17.

As shown in FIG. 11, the magnetic fluid 74 is formed by, for example, dispersing magnetic fine particles of Fe3O4 in base oil. The magnetic fluid 74 is filled in the gap C1 between the outer magnetic plate 72 and the magnetic portion 41a and in the gap C2 between the inner magnetic plate 73 and the magnetic portion 41a.

With the configuration thus described, magnetic flux generated on an inner circumferential side of the permanent magnet 71 is distributed in such a manner as to be concentrated on an inner circumferential end 72a of the outer magnetic plate 72, the magnetic portion 41a, and an inner circumferential end 75a of the inner circumferential portion 75 (the inner magnetic plate 73), forming a magnetic circuit indicated by an arrow A in FIG. 11. Accordingly, a large magnetic force is acting on each of the gap C1 and the gap C2. As a result, the magnetic fluid 74 filled in each of the gap C1 and the gap C2 is retained for a long period of time without flowing out, and thus an extremely high sealing property is obtained.

Meanwhile, as shown by arrows B1, B2, and B3 in FIG. 11, magnetic flux generated on an outer circumferential side of the permanent magnet 71 is distributed on a curve connecting the outer circumferential end 72b of the outer magnetic plate 72 to a front surface 73a (specifically, respective front surfaces of the intermediate portion 76 and the outer circumferential portion 77) of the inner magnetic plate 73. Therefore, magnetic flux dispersed from the outer circumferential end 72b of the outer magnetic plate 72 is focused in the intermediate portion 76 and the outer circumferential portion 77, which constitute a large diameter portion of the inner magnetic plate 73, so that an effective magnetic circuit is formed therebetween, thus reducing excessive magnetic flux leaking into the body front portion 12. As a result, magnetic flux distributed behind the inner magnetic plate 73 is reduced, and thus it is possible to prevent deterioration in performance of the rollers 43 of the anti-reverse device 40, so that rotational performance and the wedge action are exerted without any problem. Furthermore, due to the intermediate portion 76, the permanent magnet 71 is positioned nearer to the front and thus is separated from the anti-reverse device 40. Accordingly, magnetic flux distributed toward the anti-reverse device 40 is further reduced, and thus the rollers 43 are unlikely to be magnetized. The above-described configuration suppresses a torque loss and generation of noise in the anti-reverse device 40.

As shown in FIG. 11, the restriction body 80 is an annular component having a hole formed in a central portion thereof, through which the inner ring 41, the drive shaft sleeve 7, and the spool shaft 8 are to penetrate. Furthermore, the restriction body 80 is made of a non-magnetic material. This prevents the restriction body 80 from being magnetized by magnetic flux of the permanent magnet 71. In other words, this prevents an increase of magnetic flux distributed toward the anti-reverse device 40.

The restriction body 80 is disposed between the inner magnetic plate 73 and the anti-reverse device (the one-way clutch) 40. The restriction body 80 is formed so as to be thin in the front-rear direction and thus is plate-shaped. Furthermore, for example, the restriction body 80 is positioned closer to the front and inclined forward in a direction from an inner circumferential end 82 to an outer circumferential end 83.

The inner circumferential end 82 is in contact with a front end surface 42a of the outer ring 42 of the anti-reverse device 40, and the outer circumferential end 83 is in contact with a rear surface of the outer circumferential portion 77 of the inner magnetic plate 73. This restricts movement of the anti-reverse device (the one-way clutch) 40 in the front-rear direction (the center axis O1 direction). According to the above-described configuration, a sliding contact state between the rollers 43 and the inner ring 41 in the anti-reverse device 40 is stabilized. As a result, rotation of the drive shaft sleeve 7 is stabilized, and the wedge action of the rollers 43 are stably exerted. While the restriction body 80 of this embodiment is simply in contact with the anti-reverse device 40 and the inner magnetic plate 73, the restriction body 80 of the present invention may be formed of an elastic material that exerts such a biasing force as to separate the anti-reverse device 40 from the inner magnetic plate 73 in the front-rear direction.

Furthermore, in a case where the restriction body 80 is not provided, the anti-reverse device 40 moves forward, and thus the rollers 43 becomes likely to be magnetized, so that there might occur a rotational torque loss of the inner ring 41. On the other hand, according to this embodiment, the anti-reverse device 40 is prevented from moving forward, and thus the rollers 43 are unlikely to be magnetized, so that it is possible to prevent occurrence of rotational torque loss of the inner ring 41.

Furthermore, as shown in FIG. 8, the restriction body 80 is positioned on an inner circumferential side of the latching portions 79 of the inner magnetic plate 73, and the outer circumferential end 83 of the restriction body 80 is in contact with an inner circumferential surface 79a of each of the latching portions 79. This prevents the restriction body 80 from being displaced in the radial direction. Here, the latching portions 79 for latching the restriction body 80 is part of the inner magnetic plate 73. Therefore, while movement of the restriction body 80 in the radial direction is suppressed by the inner magnetic plate 73 that is a constituent element of the magnetic fluid seal mechanism 70, movement of the anti-reverse device 40 in the axis O1 direction is effectively restricted, and thus an increase in the number of components used is avoided to improve efficiency. Furthermore, the latching portions 79 are part of the plate-shaped inner magnetic plate 73 and thus are formed to be thin, so that a weight increase of the fishing spinning reel 1 is also avoided.

As shown in FIG. 6, each of the rear seal member 91 and the front seal member 92 has an annular shape and is an elastic seal member formed of an elastic material. In the rear seal member 91 and the front seal member 92, lip portions 91a and 92a are formed, respectively, so as to protrude in the radial direction.

The rear seal member 91 is fitted in the circumferential groove 16b of the large diameter portion 16 and is positioned closer to the rear than the first cutout 17a to the fourth cutout 17d formed in the small diameter portion 17. The lip portion 91a of the rear seal member 91 is in contact with the inner circumferential surface of the circular cylindrical portion 52 of the operation cover 50, while pressing the inner circumferential surface outward in the radial direction. Here, the lip portion 91a is in contact with a position on the circular cylindrical portion 52 closer to the front than the through holes 52a. This prevents a situation where seawater or the like that has entered the circular cylindrical portion 52 via a rear opening or the through holes 52a of the circular cylindrical portion 52 adheres to the anti-reverse device 20 in the small diameter portion 17 via the first cutout 15a to the fourth cutout 15d.

The front seal member 92 is fitted on the outer circumferential surface of the permanent magnet 71 of the magnetic fluid seal mechanism 70. The lip portion 92a of the front seal member 92 is in contact with an inner circumferential surface of the central hole 53a of front wall portion 53 of the operation cover 50, while pressing the inner circumferential surface outward in the radial direction. This prevents seawater or the like from entering the operation cover 50 via the central hole 53a.

While the foregoing has described this embodiment, the present invention is not limited to the examples described in the embodiment. Regarding the switching operation unit 55 of the present invention, for example, a configuration may be adopted in which the operation body portion 55a of the switching operation unit 55 is disposed behind and below the handle shaft 5 so that the operation body portion 55a can be operated with a ring finger or a little finger of a left hand whose palm is supporting the lower surface 2a of the reel body 2.

Furthermore, the switching operation unit 55 of the present invention may be provided on the same side as the handle Sa. In a case where, as described above, the switching operation unit 55 and the handle Sa are disposed on the same side, it becomes possible to operate the switching operation unit 55 while holding the handle Sa. Accordingly, the switching operation unit 55 can be operated without releasing a hand from the handle Sa, and thus operability in actual fishing can be improved.

Furthermore, in the present invention, the ON operation surface 55b and the OFF operation surface 55c may be in a curved surface shape instead of a planar shape. Furthermore, the switching operation unit 55 of the present invention is not necessarily limited to a configuration including the ON operation surface 55b and the OFF operation surface 55c.

While the restriction body 80 of the embodiment is positioned closer to the front and inclined forward in a direction from the inner circumferential end 82 to the outer circumferential end 83, in the present invention, the restriction body 80 may have a planar shape extending from an inner circumferential end to an outer circumferential end thereof. Furthermore, while the restriction body 80 of the embodiment has an annular shape continuous in the circumferential direction, the restriction body 80 may have a C-shape as seen from the center axis O1 direction. Furthermore, while a material of the restriction body 80 is preferably a non-magnetic material, the material may be a synthetic resin or a metal and is not particularly limited.

Next, with reference to FIG. 13 to FIG. 17, a description is given of an embodiment of a fishing spinning reel as the second aspect, the fishing spinning reel being provided with the anti-reverse device according to the first aspect. In the following description, directions referred to as "front-rear," top-bottom (upper-lower)," and "left-right" are based on those shown in FIG. 13.

Figure 13:
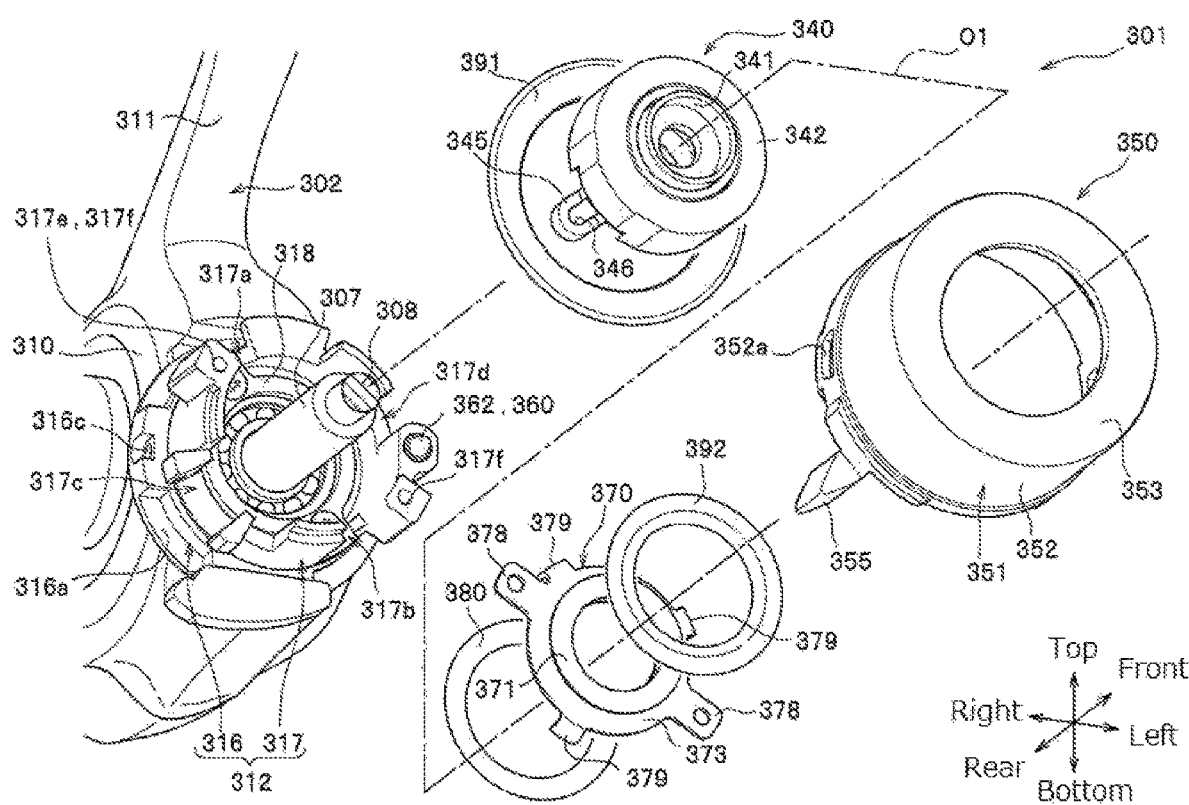
FIG. 13 is a perspective exploded view of components assembled in the body front portion in a fishing spinning reel according to an embodiment of the second aspect.

As shown in FIG. 13, a fishing spinning reel 301 is provided with a reel body 302 supporting a drive shaft sleeve 307 and a spool shaft 308, a spool (not shown) mounted on the spool shaft 308, a fishing line being wound around the spool, and a rotor (not shown) mounted on the drive shaft sleeve 307 and configured to wind the fishing line around the spool.

The reel body 2 includes a body 310 housing a driver therein, a leg portion 311 extending upward from an upper portion of the body 310 and mounted at a distal end thereof to a fishing rod, and a cylindrical body front portion 312 that is open in a front-rear direction on a front side of the body 310. The body 310, the leg portion 311, and the body front portion 312 are integrally formed using a metal material and thus have high strength.

The body front portion 312 is formed in a substantially circular cylindrical shape about a center axis O1 of the drive shaft sleeve 307. The body front portion 312 has a contour whose diameter is smaller in a front portion thereof than in a rear portion thereof. Hereinafter, the rear portion of the body front portion 312 is referred to as a large diameter portion 316 and the front portion of the body front portion 312 is referred to as a small diameter portion 317.

An anti-reverse device 340, an operation cover 350, a switching retention section 360, a magnetic fluid seal mechanism 370, a restriction body 380, a rear seal member 391, and a front seal member 392 are assembled in the body front portion 312 (the large diameter portion 316, the small diameter portion 317). The following describes details of the body front portion 312 (the large diameter portion 316, the small diameter portion 317) and the various components.

Figure 14:
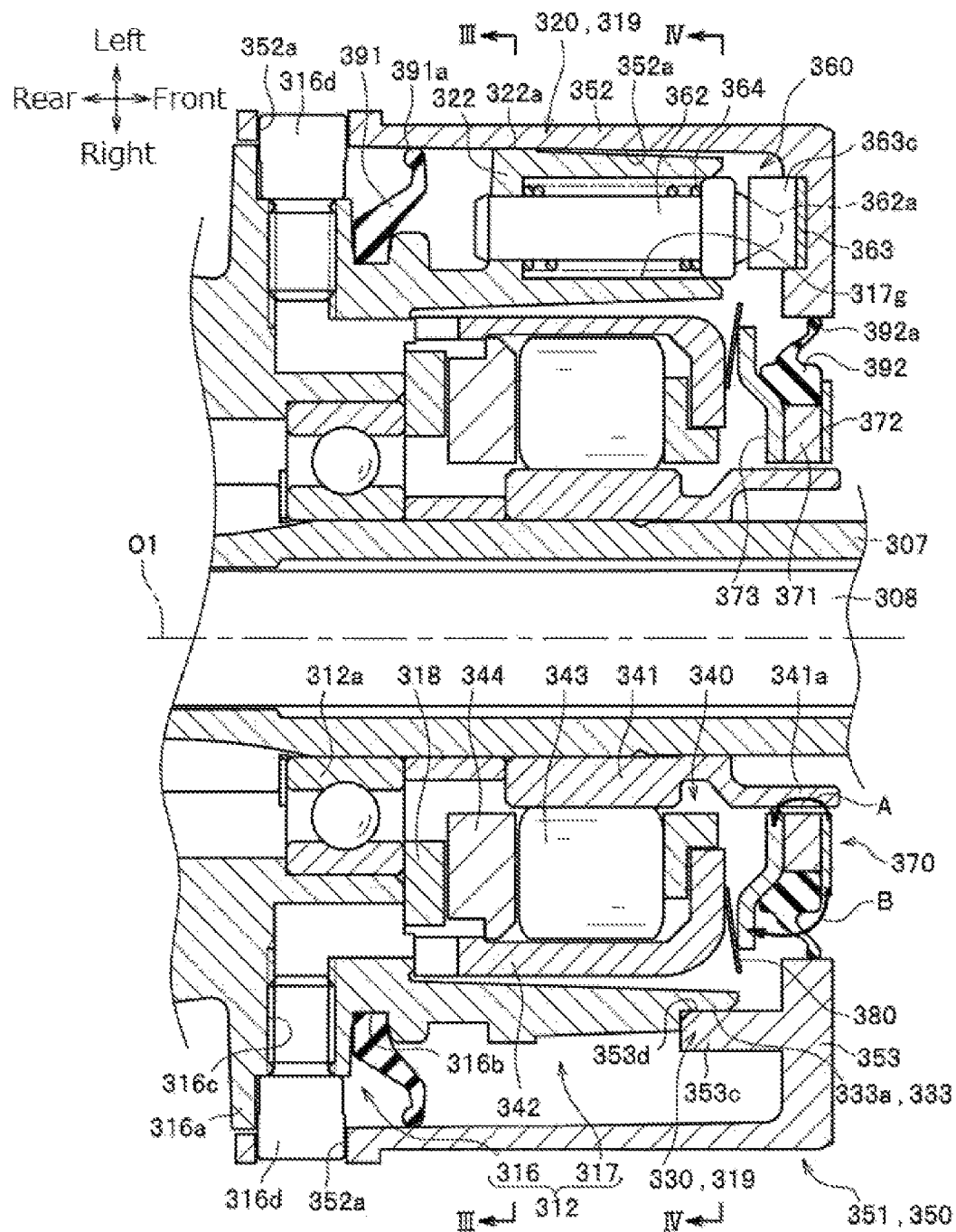
FIG. 14 is a sectional view of a cross section of a vicinity of the body front portion cut along a horizontal plane including a center axis O1 as seen from above.

As shown in FIG. 14, on an outer circumferential surface of the large diameter portion 316, there are formed a flange 316a overhanging outward in a radial direction, a circumferential groove 316b recessed over a circumferential direction, and a female screw hole 316c into which a screw 316d is screwed. The flange 316a is positioned at a rear end of the large diameter portion 316. The flange 316a has a contour in a circular shape corresponding to an inner shape of an after-mentioned switching moving body 351 of the operation cover 350. Accordingly, a rear opening of the switching moving body 351 is closed with the flange 316a, and thus seawater or the like is unlikely to enter the operation cover 350. The circumferential groove 316b is a groove for assembling the rear seal member 391 to the body front portion 312. Two female screw holes 316c are formed at an interval of 180° from each other. Furthermore, the screw 316d screwed into each of the female screw holes 316c is intended to prevent the operation cover 350 from falling off the body front portion 312.

Figure 15:
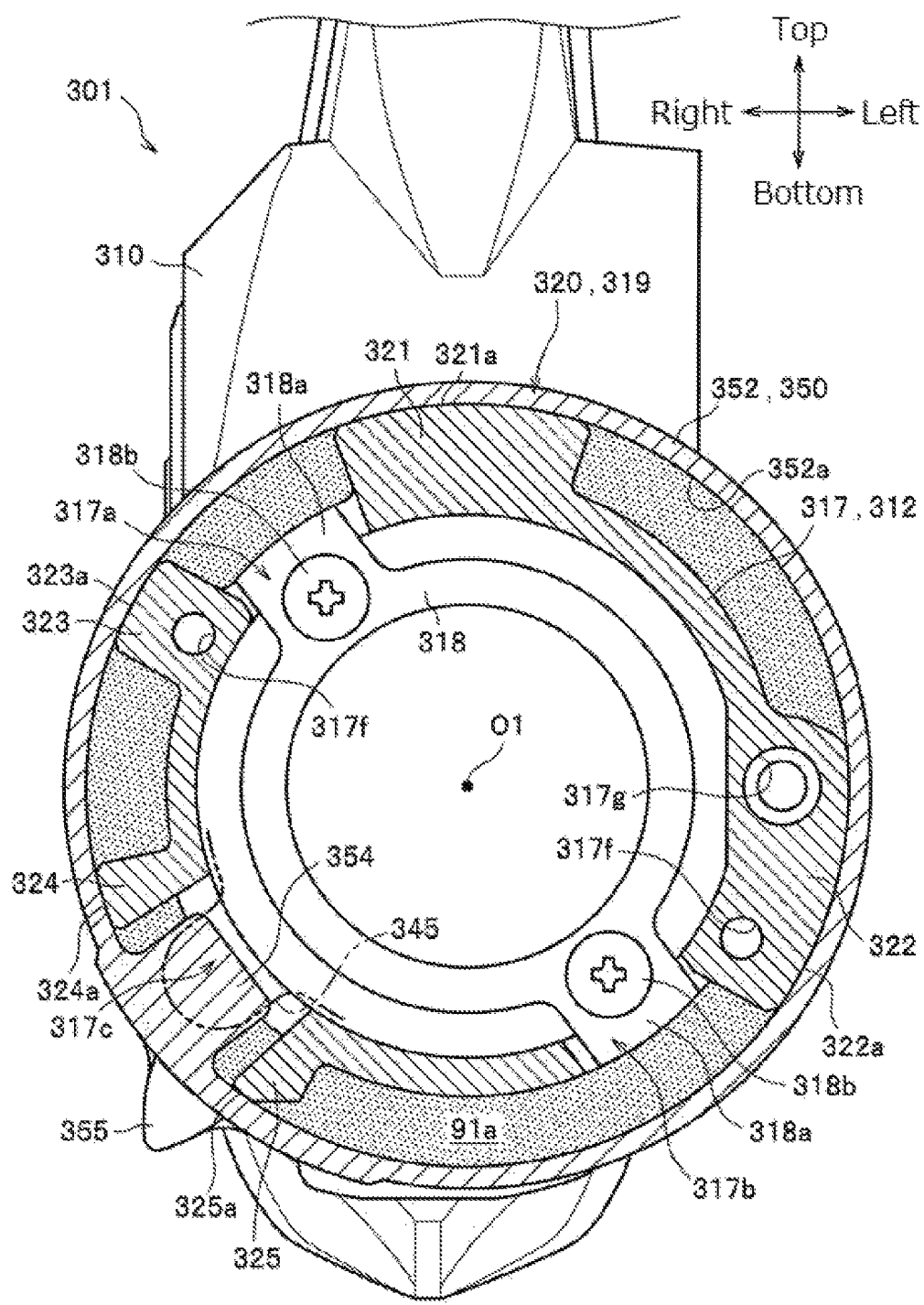
FIG. 15 is a sectional view of a cross section of the body front portion cut along a line III-III shown in FIG. 14 as seen from an arrow direction.

An intermediate bearing 312a rotatably supporting the drive shaft sleeve 307 is fitted on an inner circumferential side of the large diameter portion 316. Furthermore, a retaining ring 318 is disposed on a front side of the intermediate bearing 312a. The retaining ring 318 is a ring-shaped component that is in contact with an outer ring of the intermediate bearing 312a so as to prevent the intermediate bearing 312a from falling off the large diameter portion 316. As shown in FIG. 15, two flanges 318a are formed on the retaining ring 318 so as to protrude outward in the radial direction. Further, the flanges 318a are each fastened with a screw 318b, and thus the retaining ring 318 is fixed in the small diameter portion 317.

The small diameter portion 317 is formed so as to have an inner diameter large enough to be able to house the anti-reverse device 340 therein. Furthermore, as shown in FIG. 13, on a front end surface 317e of the small diameter portion 317, there are formed two fixing portions 317f into each of which a screw (not shown) for fixing the magnetic fluid seal mechanism 370 is screwed, and the magnetic fluid seal mechanism 370 is assembled so as to close a front opening of the body front portion 312.

The small diameter portion 317 has four cutouts (a first cutout 317a to a fourth cutout 317d) formed to extend rearward from a front end thereof and communicating between an inner circumferential side and an outer circumferential side of the small diameter portion 317.

Figure 16:
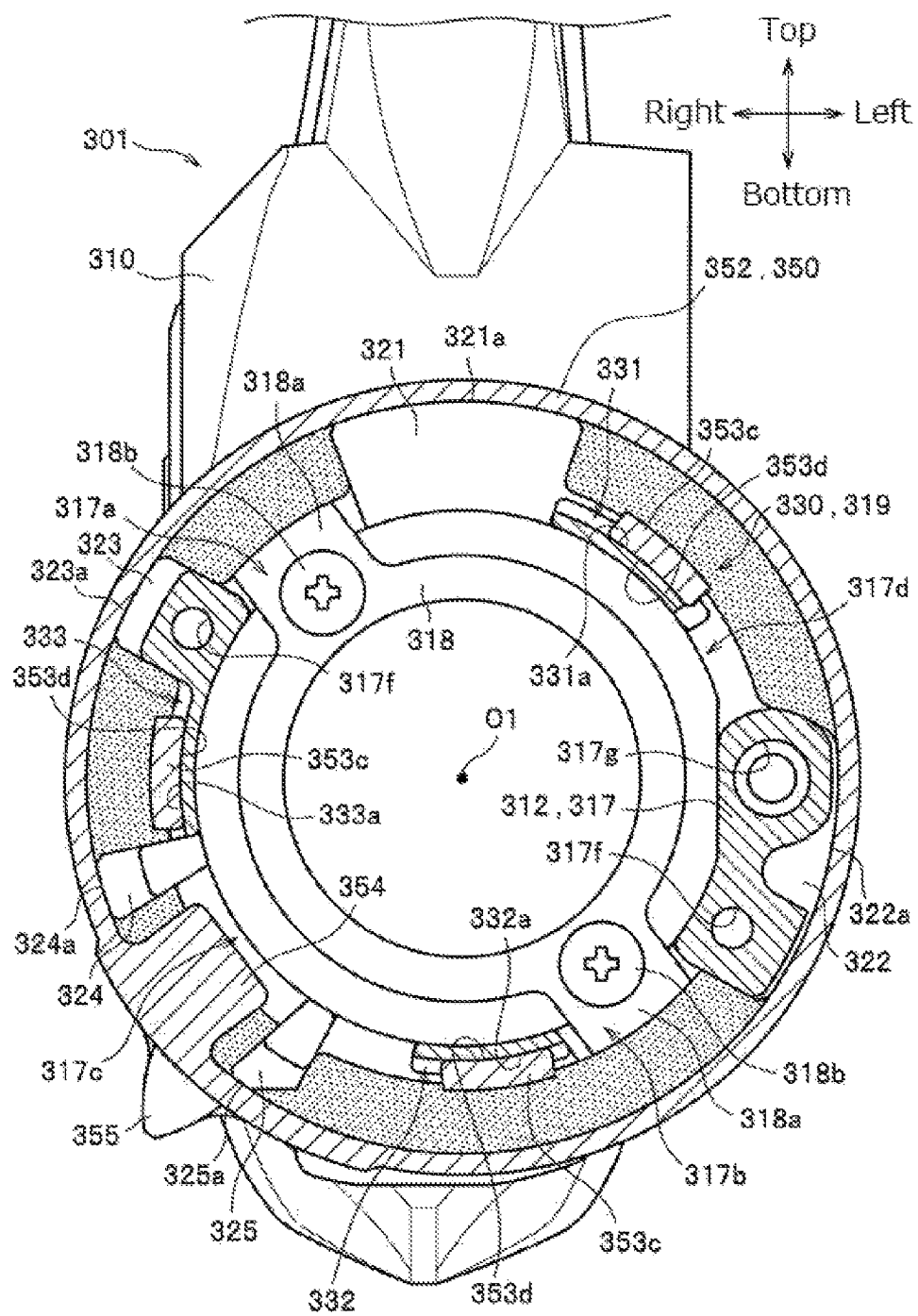
FIG. 16 is a sectional view of a cross section of the body front portion cut along a line IV-IV shown in FIG. 14 as seen from an arrow direction, in which only the inner magnetic plate is shown in the magnetic fluid seal mechanism.

As shown in FIG. 15, the first cutout 317a and the second cutout 317b are intended to pass the flanges 318a of the retaining ring 318 therethrough, respectively, so that the flanges 318a are disposed in a bottom portion. The first cutout 317a is provided on an upper right side relative to the center axis O1, and the second cutout 317b is provided on a lower left side relative to the center axis O1. The third cutout 317c is intended to receive an after-mentioned protrusion 345 of the anti-reverse device 340 and is provided on a lower right side relative to the center axis O1. As shown in FIG. 16, the fourth cutout 317d is intended to receive an after-mentioned latching portion 379 of the magnetic fluid seal mechanism 370 and is provided on an upper left side with respect to the center axis O1. A cutout amount of the fourth cutout 317d in a rearward direction from the front end surface 317e of the small diameter portion 317 is smaller than those of the other cutouts, i.e., the first cutout 317a to the third cutout 317c. Therefore, the fourth cutout 317d does not appear in FIG. 15.

As shown in FIG. 14, in the small diameter portion 317, there is provided a support portion 319 slidably supporting the operation cover 350. The support portion 319 will be detailed later.

The anti-reverse device 340 is a roller-type one-way clutch that permits forward rotation of the drive shaft sleeve 307, while preventing reverse rotation of the drive shaft sleeve 307 and thus is formed of a known device. On an inner circumferential side of the anti-reverse device 340, there is provided an inner ring 341 that is fitted to an outer circumferential side of the drive shaft sleeve 307 so as to be unrotatably locked to the drive shaft sleeve 307. Accordingly, the anti-reverse device 340 controls rotation of the drive shaft sleeve 307 via the inner ring 341.

The anti-reverse device 340 includes a substantially circular cylindrical outer ring 342, a plurality of rollers 343 disposed between the inner ring 341 and the outer ring 342, and a retainer (a switching control member) 344 retaining the plurality of rollers 343. The retainer 344 has a protrusion 345 formed thereon so as to penetrate through the outer ring 342 and protrude outward in the radial direction (see FIG. 13). The protrusion 345 is disposed in the third cutout 317c (see a broken line in FIG. 15). When the protrusion 345 is caused to move in the circumferential direction, the retainer 344 turns and the rollers 343 exerts a wedge action between the inner ring 341 and the outer ring 342, so that reverse rotation of the inner ring 341 (the drive shaft sleeve 307) is prevented, or the rollers 343 exerts no wedge action between the inner ring 341 and the outer ring 342, so that reverse rotation of the inner ring 341 (the drive shaft sleeve 307) is permitted.

Figure 17A:
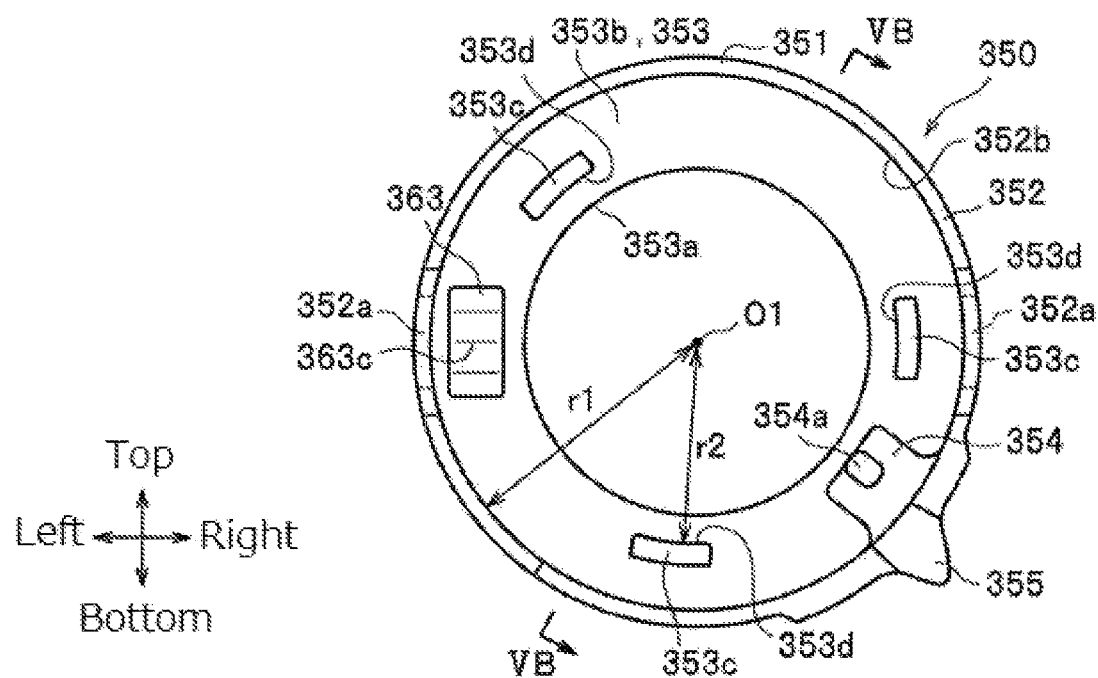
FIG. 17a is a back view of the operation cover as seen from the rear side, which is solely extracted from the fishing spinning reel.
Figure 17B:
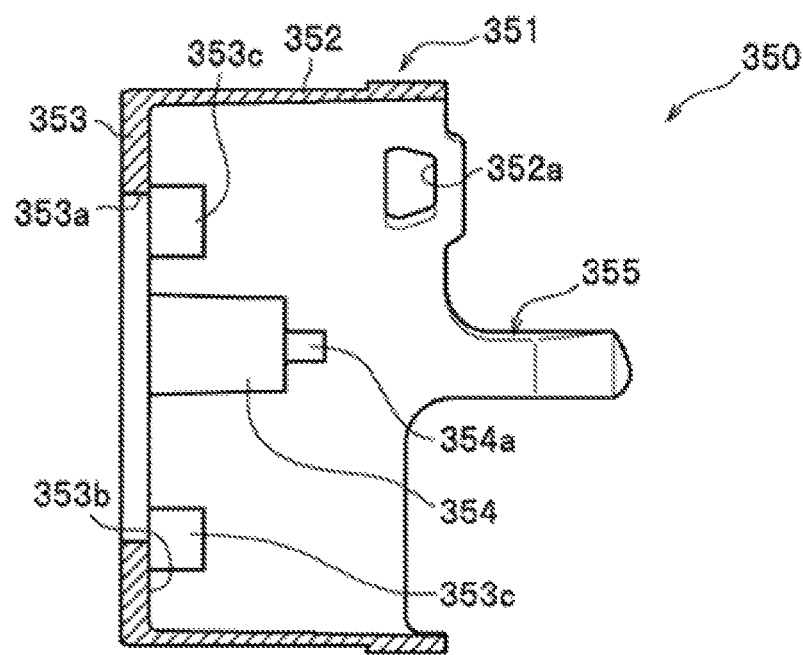
FIG. 17b is a sectional view of a cross section cut along a line VB-VB shown in FIG. 17a as seen from an arrow direction.

The operation cover 350 is a cylindrical member disposed on an outer circumferential side of the body front portion 312 (the large diameter portion 316, the small diameter portion 317). As shown in FIG. 17a and FIG. 17b, the operation cover 350 includes the bottomed cylindrical switching moving body 351, an engagement portion 354 provided on an inner side of the switching moving body 351, and a switching operation unit 355 provided at a rear end of the switching moving body 351. Although not particularly shown, the switching operation unit 355 is disposed at a side portion of the reel body 302 and can be pressed (can be operated) with fingers of an angler.

The switching moving body 351 includes a circular cylindrical portion 352 having a circular cylindrical shape about the center axis O1 and a ring-shaped front wall portion 353 extending inward in the radial direction from a front end of the circular cylindrical portion 352. As shown in FIG. 14, the switching moving body 351 surrounds the outer circumferential side of the body front portion 312 (the large diameter portion 316, the small diameter portion 317), and thus seawater, dust, or the like is unlikely to enter the anti-reverse device 340. This suppresses, for example, degradation of smoothness of the anti-reverse device 340, and thus performance of the anti-reverse device 340 is maintained for a long period of time.

As shown in FIG. 17a, the circular cylindrical portion 352 is formed so as to have an inner diameter r1. A first rear contact portion 321 to a fifth rear contact portion 325 (see FIG. 15), which will be described later, are in contact with an inner circumferential surface 352b of the circular cylindrical portion 352. The circular cylindrical portion 352 has two through holes 352a formed in a rear portion thereof at an interval of 180 degrees from each other (see FIG. 17a). In each of the through holes 352a, there is disposed the screw 316d screwed to the large diameter portion 316, and thus the operation cover 350 is prevented from falling off the body front portion 312 (see FIG. 14).

A central hole 353a of the front wall portion 353 is a hole into which the drive shaft sleeve 307 and the spool shaft 308 are to penetrate. On a rear surface (a bottom surface) 353b of the front wall portion 353, there are formed three guide walls 353c protruding rearward. The three guide walls 353c are formed so as to have an inner diameter r2. Furthermore, the three guide walls 353c are formed so as to overlap respectively with a first front contact portion 331 to a third front contact portion 333, which will be described later, as seen from a center axis O1 direction.

The engagement portion 354 is formed in a quadrangular prism shape and is continuous with the inner circumferential surface of the circular cylindrical portion 352 and the rear surface 353b of the front wall portion 353. Furthermore, on a rear end surface of the engagement portion 354, there is formed a substantially circular columnar projection 354a extending rearward. As shown in FIG. 15, the engagement portion 354 is disposed in the third cutout 317c. Further, the projection 354a (see FIG. 17a, FIG. 17b) of the engagement portion 354 is inserted into a circular hole 346 (see FIG. 13) of the protrusion 345, and thus the operation cover 350 and the retainer 344 are engaged with each other in the circumferential direction. Further, when an angler presses the switching operation unit 355 to cause the switching moving body 351 to turn, the anti-reverse device 340 is switched between a reverse-rotation inhibited state and a reverse-rotation allowed state.

As shown in FIG. 14, the switching retention section 360 includes a moving body 362 disposed in the small diameter portion 317 of the reel body 302 and an engagement retention portion 363 disposed on the rear surface (the bottom surface) 353b of the front wall portion 353 of the operation cover 350.

The moving body 362 is a circular columnar component extending in the front-rear direction. A front end 362a of the moving body 362 is formed in a conical shape. The moving body 362 is housed in a moving body housing hole 317g extending rearward through the small diameter portion 317 from the front end surface 317e thereof. Furthermore, a coil spring 364 are housed in the moving body housing hole 317g. The coil spring 364 is incorporated in a compressed state so that the moving body 362 is constantly biased forward.

As shown in FIG. 17a, the engagement retention portion 363 is a metal component that is a plate-shaped member extending in a top-bottom direction along the rear surface 353b of the front wall portion 353 and is disposed so as to be opposed to the moving body 362. A convex portion 363c is formed in a middle portion of the engagement retention portion 363 in the top-bottom direction thereof. Accordingly, when the anti-reverse device 340 attempts to switch from the reverse-rotation allowed state to the reverse-rotation inhibited state (or the anti-reverse device 340 attempts to switch from the reverse-rotation inhibited state to the reverse-rotation allowed state), the front end 362a of the moving body 362 is latched to the convex portion 363c, and thus turning of the switching moving body 351 is restricted. With the above-described configuration, unless the convex portion 363c presses the moving body 362 rearward to apply a force sufficient enough to cause the convex portion 363c to run over the front end 362a of the moving body 362, the reverse-rotation allowed state or the reverse-rotation inhibited state of the anti-reverse device 340 is retained.

As shown in FIG. 14, the magnetic fluid seal mechanism 370 includes an annular permanent magnet 371, an annular outer magnetic plate 372 disposed on a front side (an outer side) of the permanent magnet 371, an annular inner magnetic plate 373 disposed on a rear side (an inner side) of the permanent magnet 371, and a magnetic portion 341a formed integrally with the inner ring 341. Furthermore, a magnetic fluid (not shown) is filled between the outer magnetic plate 372 and the magnetic portion 341a and between the inner magnetic plate 373 and the magnetic portion 341a.

The permanent magnet 371 has a north pole on a front surface side thereof and a south pole on a rear surface side thereof, and an inner circumferential side magnetic circuit (see an arrow A in FIG. 14) and an outer circumferential side magnetic circuit (see arrow B in FIG. 14) are formed from a front surface toward a rear surface of the permanent magnet 371. Further, the magnetic fluid is disposed on the inner circumferential side magnetic circuit (the arrow A in FIG. 14) and is, therefore, unlikely to flow out, thus exhibiting a sealing capability for a long period of time.

As shown in FIG. 13, on the inner magnetic plate 373, there are formed two flanges 378 protruding outward in the radial direction and three latching portions 379 extending rearward from an outer circumferential end thereof. Each of the flanges 378 is fastened with a screw (not shown) screwed into each of the fixing portions 317f of the body front portion 312, and thus the inner magnetic plate 373 is fixed to a front side of the body front portion 312.

The three latching portions 379 extend rearward while being separated from each other in the circumferential direction and are intended to retain the restriction body 380. Although not particularly shown, the latching portions 379 are disposed in the first cutout 317a, the third cutout 317c, and the fourth cutout 317d of the small diameter portion 317, respectively, so as not to interfere with the small diameter portion 317.

As shown in FIG. 14, the restriction body 380 is an annular and thin-plate shaped component made of a non-magnetic material. The restriction body 380 is disposed between the inner magnetic plate 373 and the anti-reverse device (the one-way clutch) 340 and restricts movement of the anti-reverse device 340 in the front-rear direction (the center axis O1 direction). According to the restriction body 380, a sliding contact state between the rollers 343 and the inner ring 341 in the anti-reverse device 340 is stabilized. As a result, rotation of the drive shaft sleeve 307 is stabilized, and the wedge action of the rollers 343 are stably exerted.

Each of the rear seal member 391 and the front seal member 392 has an annular shape and is an elastic seal member formed of an elastic material. In the rear seal member 391 and the front seal member 392, lip portions 391a and 392a are formed, respectively, so as to protrude in the radial direction.

The rear seal member 391 is fitted in the circumferential groove 316b of the large diameter portion 316 and is positioned closer to the rear than the first cutout 317a to the fourth cutout 317d formed in the small diameter portion 317. The lip portion 391a of the rear seal member 391 is in contact with the inner circumferential surface 352b of the circular cylindrical portion 352 of the operation cover 350, while pressing the inner circumferential surface 352b outward in the radial direction. Furthermore, the lip portion 391a is in contact with a position on the circular cylindrical portion 352 closer to the front than the through holes 352a. The above-described configuration prevents a situation where seawater or the like that has entered the circular cylindrical portion 352 via a rear opening or the through holes 352a of the circular cylindrical portion 352 adheres to the anti-reverse device 340 in the small diameter portion 317 via the first cutout 317a to the fourth cutout 317d.

The front seal member 392 is fitted on an outer circumferential surface of the permanent magnet 371 of the magnetic fluid seal mechanism 370. The lip portion 392a of the front seal member 392 is in contact with an inner circumferential surface of the central hole 353a of the front wall portion 353 of the operation cover 350, while pressing the inner circumferential surface outward in the radial direction. This prevents seawater or the like from entering the operation cover 350 via the central hole 353a.

Next, a description is given of the support portion 319 formed in the small diameter portion 317. As shown in FIG. 14, the support portion 319 includes a rear support portion 320 slidably supporting a rear side of the operation cover 350 and a front support portion 330 slidably supporting a front side of the operation cover 350.

As shown in FIG. 15, the rear support portion 320 includes five contact portions, i.e., a first rear contact portion 321 to a fifth rear contact portion 325 protruding outward in the radial direction from an outer circumferential surface of the small diameter portion 317. The first rear contact portion 321 to the fifth rear contact portion 325 are arranged in the circumferential direction with respect to the outer circumferential surface of the small diameter portion 317.

The first rear contact portion 321 is positioned on an upper side relative to the center axis O1 and is formed in a circular arc shape (having a large width in the circumferential direction) extending in the circumferential direction. The second rear contact portion 322 is positioned on a left side relative to the center axis O1 and is formed in a circular arc shape (having a large width in the circumferential direction) extending in the circumferential direction. The third rear contact portion 323 is positioned on an upper right side relative to the center axis O1 and is formed so as to have a small width in the circumferential direction. The fourth rear contact portion 324 is positioned on an upper side relative to the center axis O1 and is formed so as to have a small width in the circumferential direction. The fifth rear contact portion 325 is positioned on a lower right side relative to the center axis O1 and is formed so as to have a small width in the circumferential direction.

The first rear contact portion 321 to the fifth rear contact portion 325 are formed so as to have an outer diameter equal to the inner diameter r1 (see FIG. 17a) of the circular cylindrical portion 352 of the operation cover 350. Therefore, respective outer circumferential surfaces 321a to 325a of the first rear contact portion 321 to the fifth rear contact portion 325 are in contact with the inner circumferential surface 352b of the circular cylindrical portion 352 of the operation cover 350, and the operation cover 350 is supported so as to be slidable in the circumferential direction.

The first rear contact portion 321, the fourth rear contact portion 324, and the fifth rear contact portion 325 are formed in a reduced thickness in the front-rear direction (the center axis O1 direction) so as not to come into contact with a front side of the inner circumferential surface 352b of the operation cover 350. Furthermore, the second rear contact portion 322 (see FIG. 14) and the third rear contact portion 323 (not shown in FIG. 14) are formed so as to be relatively elongated in the front-rear direction (the center axis O1 direction). The second rear contact portion 322 and the third rear contact portion 323, however, are decreased in outer diameter toward the front side. Therefore, an outer circumferential surface 322a of the second rear contact portion 322 and an outer circumferential surface 323a of the third rear contact portion 323 come into contact, only on respective rear sides thereof, with the inner circumferential surface 352b of the operation cover 350.

Each of the first rear contact portion 321 to the fifth rear contact portion 325 is separated in the circumferential direction from the other rear contact portions (the rest of the first rear contact portion 321 to the fifth rear contact portion 325) arranged in the circumferential direction, and thus the first rear contact portion 321 to the fifth rear contact portion 325 are not continuous in the circumferential direction. That is, the rear support portion 320 is in contact with the inner circumferential surface 352b of the operation cover 350, but not over an entire circumference of the inner circumferential surface 352b. Therefore, a contact area (a sliding area) of the rear support portion 320 with the inner circumferential surface 352b of the circular cylindrical portion 352 is reduced, and thus smooth turning of the operation cover 350 is achieved. Furthermore, the rear support portion 320 is composed of the first rear contact portion 321 to the fifth rear contact portion 325 separated in the circumferential direction, thus achieving a further weight reduction compared with a case where an annular contact portion is formed so as to be continuous in the circumferential direction.

As shown in FIG. 15, a space is formed between each pair of adjacent ones of the first rear contact portion 321 to the fifth rear contact portions 325. Further, the protrusion 345 of the anti-reverse device 340 and the engagement portion 354 of the operation cover 350 are disposed in the space between the fourth rear contact portion 324 and the fifth rear contact portion 325. That is, since the first rear contact portion 321 to the fifth rear contact portion 325 are separated from each other in the circumferential direction, it is possible to provide a space for disposing the protrusion 345 and the engagement portion 354, thus contributing to a size reduction of the fishing spinning reel 301.

As shown in FIG. 16, the front support portion 330 includes three contact portions, i.e., a first front contact portion 331 to a third front contact portion 333 obtained by recessing the outer circumferential surface of the small diameter portion 317 inward in the radial direction. The first front contact portion 331 to the third front contact portion 333 are positioned in a front end portion of the small diameter portion 317 and arranged in the circumferential direction. Furthermore, the first front contact portion 331 to the third front contact portion 333 have an outer diameter smaller than that of the rear support portion 320. Accordingly, in assembling the operation cover 350 to the body front portion 312, there is no fear that the first front contact portion 331 to the third front contact portion 333 are caught on the inner circumferential surface 352b of the operation cover 350, and thus assembling ease is provided.

The first front contact portion 331 is positioned on an upper left side relative to the center axis O1. The second front contact portion 332 is positioned on a lower side relative to the center axis O1. The third front contact portion 333 is positioned on a right side relative to the center axis O1.

The first front contact portion 331 to the third front contact portion 333 are formed so as to have an outer diameter equal to the inner diameter r2 (see FIG. 17a) of the guide walls 353c of the operation cover 350. Therefore, respective outer circumferential surfaces 331a to 333a of the first front contact portion 331 to the third front contact portion 333 are in contact with respective inner circumferential surfaces 353d of the guide walls 353c of the operation cover 350, and the operation cover 350 is supported so as to be slidable in the circumferential direction.

Each of the first front contact portion 331 to the third front contact portion 333 is separated in the circumferential direction from the other front contact portions (the rest of the first front contact portion 331 to the third front contact portion 333) arranged in the circumferential direction. That is, the front support portion 330 is not configured to come into contact with an inner circumferential side of the operation cover 350 over an entire circumference thereof. Therefore, a contact area (a sliding area) of the front support portion 330 with the operation cover 350 is reduced, and thus smooth turning of the operation cover 350 is achieved. Furthermore, since the first front contact portion 331 to the third front contact portion 333 are separated from each other in the circumferential direction, the three guide walls 353c being in contact therewith are also separated from each other in the circumferential direction. Therefore, the operation cover 350 achieves a further weight reduction compared with a case where an annular guide wall is formed so as to be continuous in the circumferential direction.

As shown in FIG. 14, the front support portion 330 (the first front contact portion 331 to the third front contact portion 333) is separated from the rear support portion 320 (the first rear contact portion 321 to the fifth rear contact portion 325) in the front-rear direction. That is, the support portion 319 does not slidably support the operation cover 350 in a region between the front support portion 330 and the rear support portion 320. Therefore, a contact area (a sliding area) of the support portion 319 with the operation cover 350 is further reduced, and thus smooth turning of the operation cover 350 is achieved.

As shown in FIG. 16, the front support portion 330 (the first front contact portion 331 to the third front contact portion 333) and the rear support portion 320 (the first rear contact portion 321 to the fifth rear contact portion 325) are arranged so as to be circumferentially out of alignment with each other. That is, the first front contact portion 331 to the third front contact portion 333 and the first rear contact portion 321 to the fifth rear contact portion 325 are well-proportionally arranged, respectively. Therefore, the operation cover 350 is unlikely to be inclined, and thus a stable attitude and smooth turning of the operation cover 350 are achieved.

While the foregoing has described the fishing spinning reel 301 of the second aspect, the present invention is not limited thereto. While the support portion 319 includes the rear support portion 320 and the front support portion 330, the support portion 319 may include another support portion as well or have a configuration in which the rear support portion 320 has an outer circumferential surface elongated in an axial direction and the front support portion 330 is not provided. Furthermore, the rear support portion 320 of the support portion 319 may be formed in the large diameter portion 316 instead of the small diameter portion 317. Alternatively, the first front contact portion 331 to the third front contact portion 333 may be formed so as to overlap with the first rear contact portion 321 to the fifth rear contact portion 335 in the circumferential direction.

What is claimed is:

1. An anti-reverse device for a fishing spinning reel, comprising:
 a switching moving body movably provided on a reel body and configured to switch a drive body between a reverse-rotation inhibited state or a reverse-rotation allowed state, the drive body being driven through a handle operation; and
 a switching retention section for restricting movement of the switching moving body to retain the reverse-rotation inhibited state or the reverse-rotation allowed state,
 wherein the switching retention section includes:
  a moving body provided in the reel body; and
  an engagement retention portion provided in the switching moving body,
 wherein the moving body and the engagement retention portion are arranged in a rotation axis direction of the drive body so as to be opposed to each other,
 the moving body is constantly biased toward the engagement retention portion,
 the moving body is disposed in a body front portion of the reel body and biased frontward, and
 the engagement retention portion is attached to a bottom surface of the switching moving body and disposed to be engageably opposed to the moving body.

2. The anti-reverse device for a fishing spinning reel according to claim 1, wherein
 the switching moving body is made of a synthetic resin and is a bottomed cylindrical component surrounding the body front portion of the reel body and supported so as to be turnable by a predetermined angle, and
 the engagement retention portion is made of a metal.

3. The anti-reverse device for a fishing spinning reel according to claim 2, wherein the anti-reverse device is formed of a roller-type one-way clutch capable of switching a rotational state of the drive body by using the switching moving body.

4. The anti-reverse device for a fishing spinning reel according to claim 1, wherein at a rear end of the switching moving body, a switching operation unit is formed integrally with the switching moving body so as to extend rearward.

5. A fishing spinning reel comprising the anti-reverse device according to claim 1, wherein
 the switching moving body is an operation cover turnably supported to the body front portion of the reel body,
 a support portion slidably supporting the operation cover is provided in the body front portion,
 the support portion has a plurality of contact portions contacting with the operation cover, and
 each of the contact portions is separated in a circumferential direction from the other contact portions arranged in the circumferential direction.

6. The fishing spinning reel according to claim 5, wherein the plurality of contact portions include:
   a plurality of front contact portions contacting with a front side of the operation cover; and
   a plurality of rear contact portions contacting with a rear side of the operation cover, and
the plurality of front contact portions are separated from the plurality of rear contact portions in a front-rear direction.

7. The fishing spinning reel according to claim 6, wherein the plurality of front contact portions are circumferentially out of alignment with the plurality of rear contact portions.

8. The fishing spinning reel according to claim 6, wherein the plurality of front contact portions have an outer diameter smaller than that of the plurality of rear contact portions.

* * * * *